US010459473B2

(12) United States Patent
Miller et al.

(10) Patent No.: US 10,459,473 B2
(45) Date of Patent: Oct. 29, 2019

(54) SYSTEMS AND METHOD FOR ROUTING POWER ACROSS MULTIPLE MICROGRIDS HAVING DC AND AC BUSES

(71) Applicant: Science Applications International Corporation, McLean, VA (US)

(72) Inventors: Landon Cabell Garland Miller, Tuscaloosa, AL (US); David Michael Barrett, Burtonsville, MD (US); John Patrick Kajs, Austin, TX (US)

(73) Assignee: Science Applications International Corporation, McLean, VA (US)

( * ) Notice: Subject to any disclaimer, the term of this patent is extended or adjusted under 35 U.S.C. 154(b) by 245 days.

(21) Appl. No.: 15/265,362

(22) Filed: Sep. 14, 2016

(65) Prior Publication Data

US 2017/0003701 A1 Jan. 5, 2017

Related U.S. Application Data

(62) Division of application No. 14/175,548, filed on Feb. 7, 2014, now Pat. No. 9,459,643, which is a division
(Continued)

(51) Int. Cl.
*G06F 19/00* (2018.01)
*G05F 1/66* (2006.01)
(Continued)

(52) U.S. Cl.
CPC ............ *G05F 1/66* (2013.01); *G05B 19/0428* (2013.01); *G06F 1/263* (2013.01); *H02J 3/06* (2013.01);
(Continued)

(58) Field of Classification Search
CPC ..... G05F 1/66; H02J 13/0006; H02J 13/0055; H02J 4/00; H02J 3/06; H02J 3/34; G05B 19/0428; G05B 2219/2203; G06F 1/263
See application file for complete search history.

(56) References Cited

U.S. PATENT DOCUMENTS

| 5,804,953 A * | 9/1998 | Bowyer .................. H02M 1/10 323/256 |
| 6,295,215 B1 * | 9/2001 | Faria ....................... H02J 9/062 363/124 |

(Continued)

OTHER PUBLICATIONS

"Electricity Trading Among Microgrids", Thesis by Sheikh Muhammad Ali, University of Strathclyde, 2009.*
(Continued)

*Primary Examiner* — Michael D Masinick
(74) *Attorney, Agent, or Firm* — Dawn-Marie Bey; Bey & Cotropia PLLC

(57) ABSTRACT

Systems and methods are described herein for managing the operations of a plurality of microgrid modules. A microgrid module includes transformers and/or power converters necessary for modifying the input AC or DC power sources to meet the required characteristics of the output power. The microgrid module further comprises a control software module and a power router software module. The control software module receives data from sensors in the microgrid module and controls the flow of power with controllable elements. The power router software module controls the operation of the power router. The power router can detect changes in demand for power within the microgrid module or from other microgrid modules. The power router can adjust the flow of power between the microgrid modules in response to changes in the supply of power to the microgrid module and changes in the demand for power from the microgrid module.

14 Claims, 19 Drawing Sheets

Related U.S. Application Data of application No. 13/887,619, filed on May 6, 2013, now Pat. No. 8,649,914, which is a division of application No. 12/760,631, filed on Apr. 15, 2010, now Pat. No. 8,447,435.

(51) Int. Cl.
| | | |
|---|---|---|
| *H02J 3/06* | (2006.01) | |
| *H02J 4/00* | (2006.01) | |
| *H02J 13/00* | (2006.01) | |
| *G06F 1/26* | (2006.01) | |
| *G05B 19/042* | (2006.01) | |
| *H02J 3/34* | (2006.01) | |

(52) U.S. Cl.
CPC ............ *H02J 4/00* (2013.01); *H02J 13/0006* (2013.01); *H02J 13/0055* (2013.01); *G05B 2219/2203* (2013.01); *H02J 3/34* (2013.01)

(56) References Cited

U.S. PATENT DOCUMENTS

| | | | | |
|---|---|---|---|---|
| 6,603,672 B1* | 8/2003 | Deng | ........... | H02J 7/345 363/37 |
| 6,693,409 B2* | 2/2004 | Lynch | ........... | H02J 3/18 307/11 |
| 6,724,644 B2* | 4/2004 | Loef | ........... | H02M 1/4241 363/132 |
| 6,765,370 B2* | 7/2004 | Bradley | ........... | H02M 3/1582 323/222 |
| 6,778,414 B2* | 8/2004 | Chang | ........... | H02J 3/34 363/67 |
| 6,819,087 B2* | 11/2004 | Delmerico | ........... | H02J 3/24 322/19 |
| 6,847,130 B1* | 1/2005 | Belehradek | ........... | H02J 7/0072 307/66 |
| 7,057,376 B2* | 6/2006 | Cook | ........... | B60R 16/03 323/207 |
| 7,062,359 B2* | 6/2006 | Bjorklund | ........... | H02H 1/0061 340/3.1 |
| 7,116,010 B2* | 10/2006 | Lasseter | ........... | H02J 3/46 307/45 |
| 7,117,044 B2* | 10/2006 | Kocher | ........... | G05B 11/32 700/34 |
| 7,274,974 B2* | 9/2007 | Brown | ........... | H02J 3/14 307/7 |
| 7,652,393 B2* | 1/2010 | Moth | ........... | H02J 9/062 307/64 |
| 7,786,616 B2* | 8/2010 | Naden | ........... | H02J 3/28 307/64 |
| 7,834,479 B2* | 11/2010 | Capp | ........... | H02J 3/04 307/21 |
| 7,978,445 B2* | 7/2011 | Ritter | ........... | H02P 9/007 361/18 |
| 8,067,855 B2* | 11/2011 | Mumtaz | ........... | H02M 7/4807 307/45 |
| 8,140,194 B2* | 3/2012 | Iino | ........... | H02J 3/14 700/295 |
| 8,164,217 B1* | 4/2012 | Miller | ........... | H02J 3/381 307/26 |
| 8,183,714 B2* | 5/2012 | McDonnell | ........... | H02J 3/34 307/82 |
| 8,193,661 B2* | 6/2012 | Jagota | ........... | H02J 1/10 307/65 |
| 8,289,742 B2* | 10/2012 | Adest | ........... | G01S 3/7861 363/71 |
| 8,315,745 B2* | 11/2012 | Creed | ........... | H02J 3/14 700/295 |
| 8,345,454 B1* | 1/2013 | Krolak | ........... | H02M 7/42 307/31 |
| 8,401,709 B2* | 3/2013 | Cherian | ........... | H02J 3/00 700/291 |
| 8,421,270 B1* | 4/2013 | Miller | ........... | H02J 3/02 307/45 |
| 8,442,698 B2* | 5/2013 | Fahimi | ........... | H02J 3/32 700/287 |
| 8,447,435 B1* | 5/2013 | Miller | ........... | G06F 1/263 700/286 |
| 2002/0036430 A1 | 3/2002 | Welches et al. | | |
| 2002/0135492 A1* | 9/2002 | Reagan | ........... | G08C 23/02 340/3.9 |
| 2003/0218549 A1 | 11/2003 | Logvinov et al. | | |
| 2004/0061380 A1* | 4/2004 | Hann | ........... | H02J 1/06 307/43 |
| 2004/0124711 A1* | 7/2004 | Muchow | ........... | F03D 9/007 307/64 |
| 2004/0125618 A1* | 7/2004 | De Rooij | ........... | H02J 1/102 363/17 |
| 2005/0105306 A1* | 5/2005 | Deng | ........... | H02M 5/4585 363/37 |
| 2006/0092588 A1* | 5/2006 | Realmuto | ........... | H02J 1/10 361/62 |
| 2007/0273211 A1* | 11/2007 | Wang | ........... | H02J 1/12 307/45 |
| 2008/0103630 A1* | 5/2008 | Eckroad | ........... | H02J 3/02 700/286 |
| 2008/0143304 A1* | 6/2008 | Bose | ........... | H02J 3/06 323/205 |
| 2008/0269953 A1* | 10/2008 | Steels | ........... | H02J 7/0004 700/295 |
| 2008/0290143 A1* | 11/2008 | Neklyudov | ........... | B21B 1/38 228/265 |
| 2008/0298103 A1* | 12/2008 | Bendre | ........... | H02M 7/487 363/89 |
| 2008/0301757 A1 | 12/2008 | Demarest et al. | | |
| 2009/0001815 A1* | 1/2009 | Kohler | ........... | H02J 3/14 307/64 |
| 2009/0289507 A1* | 11/2009 | Shiu | ........... | H02J 9/005 307/131 |
| 2009/0326724 A1* | 12/2009 | Lasseter | ........... | H02J 9/062 700/287 |
| 2010/0001587 A1* | 1/2010 | Casey | ........... | H01L 31/02021 307/80 |
| 2010/0008117 A1* | 1/2010 | Luthi | ........... | H02J 9/005 363/126 |
| 2010/0138066 A1* | 6/2010 | Kong | ........... | G06Q 30/018 700/295 |
| 2010/0292853 A1* | 11/2010 | McDonnell | ........... | H02J 3/34 700/287 |
| 2011/0026282 A1* | 2/2011 | Chapman | ........... | H02J 3/38 363/65 |
| 2011/0080143 A1* | 4/2011 | Parakulam | ........... | H02M 3/1582 320/162 |
| 2011/0093127 A1* | 4/2011 | Kaplan | ........... | G06Q 10/04 700/292 |
| 2011/0231028 A1* | 9/2011 | Ozog | ........... | G06Q 10/06 700/291 |
| 2011/0278931 A1* | 11/2011 | Johnson, Jr. | ........... | H02J 3/26 307/66 |
| 2012/0173035 A1* | 7/2012 | Abe | ........... | H02J 3/00 700/297 |
| 2012/0232709 A1* | 9/2012 | Robinett, III | ........... | H02J 3/38 700/286 |

OTHER PUBLICATIONS

"Characterization of Microgrids in the United States," Final Whitepaper by Resource Dynamics Corporation (Jan. 2005).

M. Mahmoodi, R. Noroozian, G. B. Gharehpetian, M. Abedi, "A Suitable Power Transfer Control System for Interconnection Converter of DC Microgrids," International Conference on Renewable Energies and Power Quality (ICREPQ), Mar. 12-14, 2008, Santander, Spain.

M. Mahmoodi, G. B. Gharehpetian, "Simple Electrical Circuit for Large Signal Modeling of DC Microgrids," International Conference on Renewable Energies and Power Quality (ICREPQ), Apr. 15-17, 2009, Valencia, Spain.

(56) References Cited

OTHER PUBLICATIONS

J. Wang, J. Zhang, Y. Zhong, "Study on a Super Capacitor Energy Storage System for Improving the Operating Stability of Distributed Generation System," DRPT2008, Apr. 6-9, 2008, Nanjing, China.
ICREPQ08 Programme, Santander, Mar. 12, 13, 14, 2008.
Specifications and Claims for U.S. Appl. No. 12/760,631, filed Apr. 15, 2010.
Specifications and Claims for U.S. Appl. No. 12/828,637, filed Jul. 1, 2010.
Specifications and Claims for U.S. Appl. No. 13/427,876, filed Mar. 22, 2012.
Abdallah, et al., "Control Dynamics of Adaptive and Scalable Power and Energy Systems for Military Micro Grids," Constructions Engineering Research Laboratory, U.S. Army Corps of Engineers, Dec. 2006.
Balog, R. S., Krein, P. T., "Bus Selection in Multibus DC Power Systems," Electric Ship Technologies Symposium, 2007, ESTS '07, IEEE, pp. 281, 287, May 21-23, 2007.
Barnes, et al., "Real-World Microgrids—An Overview," IEEE International Conference on System of Systems Engineering, pp. 1-8, Apr. 2007.
Seul-Ki, et al., "Dynamic Modeling and Control of a Grid-Connected Hybrid Generation System With Versatile Power Transfer," IEEE Trans. Ind. Electron., vol. 55, No. 4, pp. 1677-1688, Apr. 2008.

\* cited by examiner

SYSTEMS AND METHOD FOR ROUTING POWER ACROSS MULTIPLE MICROGRIDS HAVING DC AND AC BUSES

CROSS-REFERENCE TO RELATED APPLICATIONS

This application is a division of application Ser. No. 14/175,548 filed Feb. 7, 2014 entitled "Routing Power Across Multiple Microgrids Having DC and AC Buses," which is a division of application Ser. No. 13/887,619 filed May 6, 2013 entitled "Method For Routing Power Across Multiple Microgrids Having DC and AC Buses," now U.S. Pat. No. 8,649,914, which is a division of application Ser. No. 12/760,631 filed Apr. 15, 2010 entitled "System and Method For Routing Power Across Multiple Microgrids Having DC and AC Buses," now U.S. Pat. No. 8,447,435, both of which are incorporated herein by reference in their entirety. The present application incorporates by reference the following co-owned U.S. patent applications: application Ser. No. 12/760,647 filed Apr. 15, 2010 entitled "System and Method For a Controlled Interconnected DC and AC Bus Microgrid," now U.S. Pat. No. 8,421,270, and application Ser. No. 12/760,654, filed Apr. 15, 2010 entitled "System and Method for Management of a DC and AC Bus Microgrid," now U.S. Pat. No. 8,164,217.

BACKGROUND OF THE INVENTION

Field of the Invention

The present invention relates generally to microgrids for controlling small distributed energy resources (DERs). More specifically, the present invention relates to a system and method for routing power between multiple microgrids with DC and AC inputs and outputs.

Description of Related Art

In general, microgrids are electric networks that are capable of deriving power from a number of sources including the conventional power grid, localized power generating capabilities and alternative power sources such as solar arrays and wind turbines. The microgrid can aggregate power from a number of sources, converting the different formats of power derived from multiple and diverse sources to common voltage and frequency formats that can be subsequently distributed to one or a number of loads. In addition, the microgrid can maintain the reliability of power to one or a number of loads in the face of changing power levels that are derived from the multiple and diverse sources. A microgrid can be coordinated to provide power from a variety of power sources and to provide power with greater reliability. For example, a microgrid can provide an alternate source of power to a site when there is an interruption in the power delivered by the conventional utility power grid. A microgrid also can provide an alternate source of power, such as power from a renewable energy source, when renewable energy is preferred over power delivered by the conventional utility power grid. The power that the microgrid supplies to a site may be derived from a variety of sources including energy storage devices, alternative energy sources such a s wind or solar power, or from burning conventional fossil fuels. A description of prior art microgrid configurations is found in the whitepaper entitled "Characterization of Microgrids in the United States" prepared for Sandia National Laboratories by Resource Dynamics Corporation dated January 2005 and incorporated herein by reference in its entirety.

In general, there are prior patents and published patent applications directed to various aspects of microgrids. For example, U.S. Pat. No. 7,116,010 relates to the control of small distributed energy resources. U.S. Pat. No. 6,603,672 discloses a power converter system which allows various types of power formats to be derived from a variety of sources and converted in a predetermined manner to supplement power for a localized grid. U.S. Pat. No. 5,804,953 discloses a power converter for converting AC shore power for shipboard use, which converts a variety of shore voltages for shipboard use. U.S. Pat. No. 6,819,087 discloses a distributed resource stabilization control for microgrid applications. U.S. Pat. No. 6,778,414 relates to a distributed system and methodology for electrical power regulation, conditioning and distribution on an aircraft. U.S. Pat. No. 6,765,370 discloses a system and method for bi-directional power conversion in a portable device. U.S. Published Patent Application No. 2008/0143304 describes a system and method for controlling a microgrid. U.S. Patent Application No. 2005/0105306 discloses a power converter that is adaptable for interfacing a variety of power sources with a three-phase AC power grid. U.S. Patent Application No. 2004/0124711 discloses a mobile power system housed in a standard freight container; the system distributes power in a plurality of configurations such as different voltage. U.S. Patent Application No. 2004/0061380 discloses a power management system for variable load applications. U.S. Patent Application No. 2002/0036430 discloses a local area grid for distributed power.

The disclosures in these prior patents and published patent applications is hereby incorporated herein by reference in their entirety. However, as described further below, none of these prior patents or published patent applications provides the solutions of the invention described and claimed in this application.

SUMMARY OF THE INVENTION

Summary of the Problem

The present state of the art for microgrid technology has several deficiencies, including the absence of a comprehensive system and method for managing the operation of a microgrid module capable of handling AC to AC, DC to DC, AC to DC, and DC to AC across multiple inputs and outputs. There is a further need to be able to manage the operation of multiple microgrid modules that are coupled together. Absent from the prior art is a scalable system capable of managing multiple microgrid modules. Finally, there is a need for a system and method for managing multiple microgrid modules that can respond to changes in power availability and loads by adjusting the flow of power supplied to and by the multiple microgrid modules.

Thus there is a need for advances in the art of electrical microgrids and their management that addresses these deficiencies. Such deficiencies are overcome by the present invention, as is further detailed below.

Summary of the Solution

The present invention addresses the foregoing limitations in the existing art by providing a system and method for managing multiple microgrid modules that can each operate with AC to AC, DC to DC, AC to DC, and DC to AC across multiple inputs and outputs. The present invention comprises a power router element that can be installed in or coupled to a microgrid module capable of sensing demand for power from another microgrid module and controlling the flow of power to and from the other microgrid module. The microgrid module comprises a microgrid computer installed with control software modules to control the operation of the microgrid module. Power router software modules used to control the power router element can be installed on the microgrid computer with the other control software modules, on the power router element, or on a separate computing device. The power router element, the power router software modules, and the control software modules support the management and sharing of power between multiple microgrid modules coupled together.

In a first exemplary embodiment, the invention comprises an apparatus for managing a microgrid module comprising a microgrid computer coupled to the circuit layer of the microgrid module. The microgrid computer can comprise a control software module and a power router software module that control the operation of the microgrid module. The microgrid module comprises a power router that can detect a demand for power from a second microgrid module and communicate that demand to the power router software module. The power router software module can compare the demand to rules controlling the operation of the microgrid module. If the rules permit, the power router software module can direct the power router to increase the power supplied by the microgrid module to the second microgrid module. The power router of the microgrid module transmits power to a second power router of the second microgrid module via an inter-microgrid connection. The power router can also comprise a boost/buck component for increasing or decreasing the voltage of power transmitted on the inter-microgrid connection.

In another exemplary embodiment, the invention comprises a method for controlling the operation of a plurality of microgrid modules. The method comprises a power router of a first microgrid module detecting a demand for power from a second microgrid module. A power router software module can receive the demand and, if the demand satisfies one or more rules stored in computer-readable memory, the power router software module can authorize the power router to increase the power supplied to the second microgrid module. The method further comprises a sensor detecting an interruption in the power supplied to the first microgrid module. In such a situation, the power router can decrease the power the first microgrid supplies to the second microgrid module and increase the power the first microgrid draws from the second microgrid.

In yet another exemplary embodiment, the invention composes a computer-readable memory comprising computer-executable instructions for execution on a first microgrid computer of a first microgrid module. The computer-readable memory can be installed on or coupled to the first microgrid computer. The computer-executable instructions include first program instructions for a control software module to receive power flow data from the first microgrid module. The instructions further include second program instructions for receiving demand data indicating a demand for additional power from a second microgrid module. Third program instructions can analyze the demand data and authorize a power router to increase the power supplied to the second microgrid module. The control software module can comprise fourth program instructions for receiving interruption data indicating an interruption in power received by the first microgrid module and fifth program instructions for determining that insufficient power is being supplied to the first microgrid module. Lastly, sixth program instructions can direct the power router to increase the power drawn from the second microgrid module to the first microgrid module.

These and other exemplary embodiments of the invention will be described in greater detail in the following text and in the associated figures.

DETAILED DESCRIPTION

Figure 1:
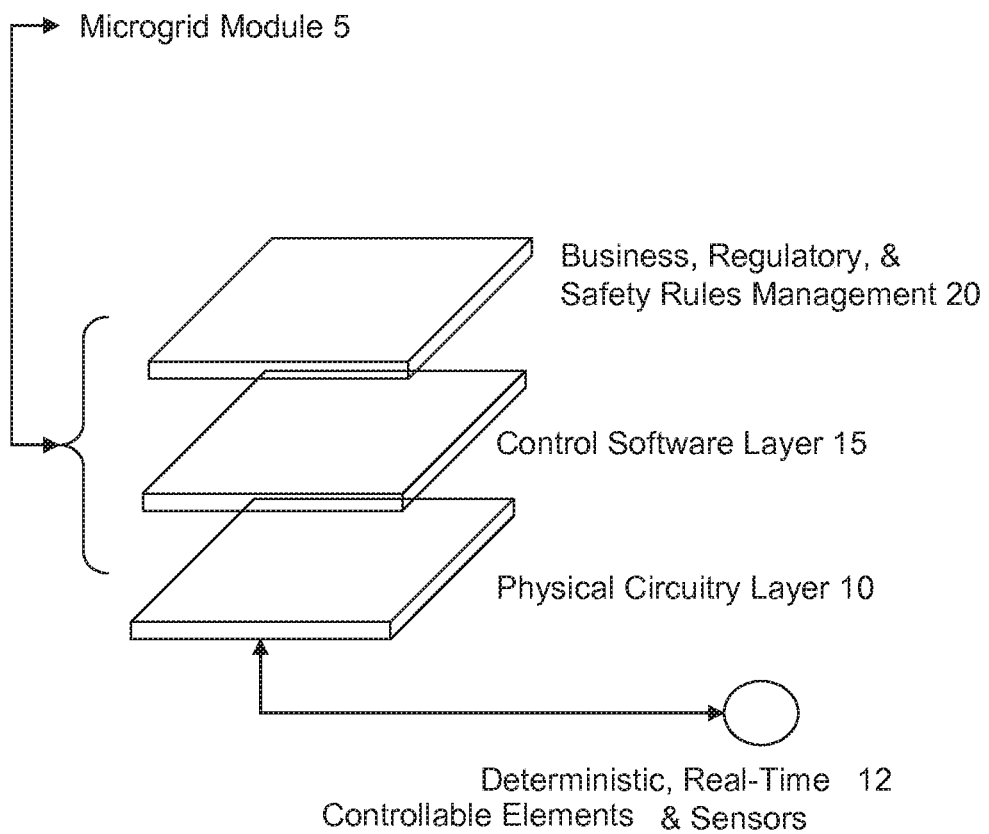
FIG. 1 is a diagram illustrating an overview of components in accordance with an exemplary embodiment of the invention.

The present invention comprises a portable microgrid module that is fully integrated, that can manage both AC and DC inputs and AC and DC outputs, and that can manage power sharing with one or more other microgrid modules. The microgrid module comprises a power router element that can detect a demand for power either from the microgrid module or from another microgrid module and can route power to or from the microgrid module. The power router element can comprise a processor and associated software modules that can communicate with software modules installed on a microgrid computer of the microgrid module. A power router software module can be installed on the power router element, on the microgrid computer, or on a separate computing device. The power router software module can make decisions concerning the routing of power to or from the microgrid module based on the power available to the microgrid module and the load demands on the microgrid module. In alternative embodiments of the invention, the power router software module can be installed in the power router element. The power router element also has the capability to increase or decrease the voltage of the power it sends and receives in order to conform to the needs of the particular load. For situations where the microgrid module is transmitting power over a significant distance to a second microgrid module, the power router can convert DC power to AC power for the transmission.

The microgrid module comprises a circuit layer comprising AC and DC buses, sensors, controllable elements, and converters. The microgrid computer further comprises a control software module, a power management module, and memory for storing rules associated with the operation of the microgrid module. The microgrid module also can include or be coupled to energy storage devices such as batteries and capacitors. The integrated control of the connection of multiple DC and AC buses within the microgrid module allows for deterministic real-time control over bi-directional power sources from intermittent and continuous renewable and conventional power sources. Real-time control over the distributed power sources supplying the microgrid module allows the microgrid module to respond to interruptions in one power supply and to transition to another power supply.

The microgrid module of the present invention can accept alternative, renewable, and conventional power inputs into both DC and AC buses and distributes or converts them as appropriate to match standardized bus values across the input, load, macrogrid, and microgrid to microgrid buses. The microgrid module can provide power conversion from DC to DC, AC to AC, AC to DC and DC to AC between the buses under dynamic local control. The microgrid of the present invention also has the capacity to store electrical energy or energy in a form transmutable into electrical energy, such as in a chemical form, for later distribution.

Each microgrid module can comprise various sub-systems and devices that include, but are not limited to, quick-connect/quick-disconnect bus bars and plates, step-up and step-down transformers, patch or inter-connection panels and intelligent breakers and sensors, batteries, ultra-capacitors, flywheels, and other temporary or permanent energy storage devices and systems and their control electronics. The microgrid module can also include power converters, circuitry to accommodate phase imbalance by providing the appropriate neutral connections, and various physical wiring and physical mounting capabilities to provide for adequate stabilization and insulation of the various components in the modular micro grid system.

As referenced above, installed on the microgrid module's computer are a power management software module and a control software module. The power management software module can retrieve one or more business parameters stored in a computer-readable memory and convert the one or more business parameters to rules for operating the microgrid module. The power management software module can store the rules in a local computer-readable memory typically located in the microgrid module's computer. The control software module receives data from sensors located in the physical circuitry layer of the microgrid module. The control software module can apply the rules stored in the local computer-readable memory to the data received from the sensors to determine which commands to send to the physical circuitry layer. The control software module sends commands to controllable elements located in the physical circuitry layer to control the operation of the microgrid module.

Turning to the figures, in which like numerals indicate like elements throughout the figures, exemplary embodiments of the present invention are illustrated and will be described in the following text. Those of skill in the art will appreciate that the following are merely non-limiting preferred embodiments and alternate embodiments can be implemented in accordance with the invention.

Referring to FIG. 1, an exemplary architecture for a microgrid module 5 can be depicted in three layers. The first layer is the physical circuitry layer 10. The physical circuitry layer comprises the AC and DC input and output buses, the sensors and controllable elements that monitor and control the flow of power into and out of the microgrid module, and other conventional electrical components such as converters and transformers. The sensors and controllable elements that monitor and control the microgrid module can vary from simple sensors and switches to more complex "intelligent" sensors and switches that can include their own software and processing capabilities. Exemplary, non-limiting embodiments of the physical circuitry layer 10 are depicted in greater detail in FIG. 3, FIGS. 4A-4D and in the related application entitled "System and Method for a Controlled Interconnected DC and AC Bus Microgrid" filed Apr. 15, 2010.

The intermediate layer of the architecture for the microgrid is the control software layer 15 and the final layer is the rules management layer 20 which includes business, regulatory and safety rules. The control software layer 15 is typically installed on a local computing device and can be implemented in, for example, active message queuing/message broker software as is known to those of ordinary skill in the art. While the control software layer is typically installed on a local computing device, those of ordinary skill in the field will understand that software modules controlling the microgrid module or its components can be installed in components of the physical circuit layer or in other computing devices coupled to the microgrid module. The control software layer 15 can also comprise a power router software module that controls a power router element located in the physical circuitry layer 10. The rules management layer 20 also is typically installed on a local computing device and can be implemented in, for example, a virtual machine with a service oriented architecture and use SOAP (Simple Object Access Protocol) as a messaging protocol. The rules management layer 20 comprises the power management software module referenced above and described in greater detail in the following text.

Figure 2:
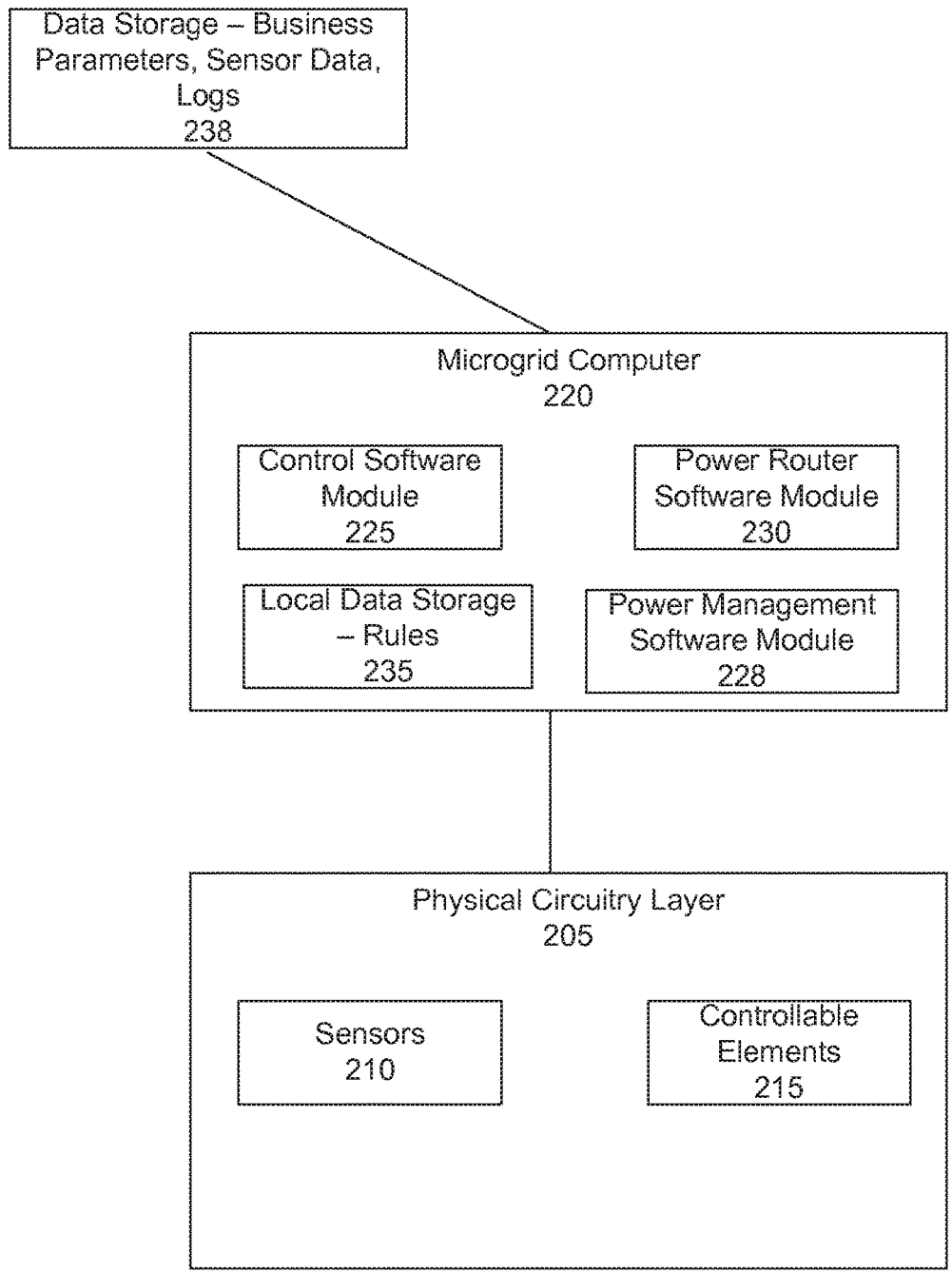
FIG. 2 is a diagram illustrating an overview of components in accordance with an exemplary embodiment of the invention.

Referring to FIG. 2, another exemplary architecture diagram illustrates in further detail the components of an exemplary microgrid module. FIG. 2 shows the physical circuit layer 205 comprising sensors 210 and controllable elements 215. The sensors 210 can collect data from the AC and DC buses (not shown in FIG. 2) and deliver the collected data to the microgrid computer 220. The sensors 210 can detect a variety of power conditions including direction, voltage, current and power levels, and associated changes and the rate of change of these parameters. For example, the sensors can provide data indicating a demand for power, data indicating the flow of power within the microgrid module, and data indicating an interruption in the flow of power to the microgrid module. The controllable elements 215 can include switches, power converters, and other intelligent electrical devices to control the flow of power to and from the microgrid module. Intelligent electrical devices typically include their own software and processing capabilities. The controllable elements 215 can receive commands from the control software module 225 of the microgrid computer 220. In certain embodiments, intelligent controllable elements can perform control functions without communicating with a separate microgrid computer. As discussed in greater detail in connection with FIGS. 4D and 6-9, the physical circuitry layer can also comprise or be coupled to a bus interface controller which is also referred to as a power router. The power router will be described in greater detail in the text associated with FIGS. 4D and 6-9.

The microgrid computer 220 provides a single or multiple user interface to the various controllable microgrid elements. The microgrid computer 220 communicates with the sensors 210 and controllable elements 215 of the physical circuit layer. The microgrid computer 220 comprises installed power management software module 228 and control software module 225. The power management software module 228 can retrieve business parameters from computer memory such as remote memory device 238. The power management software module converts the business parameters into rules that the control software module 225 can apply to the operation of a microgrid module. The control software module 225 uses the rules to process data received from the sensors 210 and generate commands for sending to the controllable elements 215.

The microgrid computer 220 can also comprise power router software module 230 that controls the flow of power to and from the microgrid module and other microgrid modules via a power router located in the physical circuitry layer 205 (not shown in FIG. 2). For example, as described further in connection with FIGS. 10-14, multiple microgrid modules can be coupled in various arrangements and share power. The power router software module 230 can be implemented to access the rules stored in memory 235 so that the rules govern decisions for routing power to and from the microgrid module. In certain embodiments, the power router software module can be installed directly in the power router element located in the physical circuitry layer, instead of being installed separately in the microgrid computer 220. In one embodiment, the power router software module can control the operation of the microgrid module on which it is installed. In other embodiments of the invention, the power router software module can operate in a centralized arrangement so that it controls the operation of several microgrid modules. In a centralized arrangement, the power router software module may be installed on a separate computing device distinct from the microgrid computer where the separate computing device is coupled to each of the several microgrid modules it controls.

Where there are multiple microgrid modules, one or more power routers can control the operation of the microgrid modules. Communication of control commands or other data between the multiple microgrid modules can take place via a communications network, for example, using Internet Protocol. Alternatively, communications between the multiple microgrid modules also can take place over power transmission lines, such as the inter-microgrid connections described in connection with FIGS. 5 through 14. For example, packets of information can be transmitted on power transmission lines along with the AC or DC power transmitted along those lines. In such an embodiment, the packets of information can comprise electrical power routing information, as well as other control commands.

The microgrid computer 220 also can comprise local data storage 235 and can be coupled to remote data storage 238. The remote storage device 238 can store business parameters, sensor data, and log data. The business parameters can be defined by the operator of the microgrid and may represent a variety of "real world" parameters. As one example, the business parameters can represent the costs of power from the conventional AC power grid and from alternate power sources coupled to the microgrid. In another example, the business parameters can represent expected load demands and preferences for certain power sources. The sensor data that can be stored at the remote data storage device 238 is the data the control software module 225 receives from the sensors 210. The sensor data stored at the remote data storage device 238 can also comprise data the power router software module 230 receives from the power router. The power management software module 228 can access this sensor data to adjust the rules based on the operation of the microgrid module. The remote storage device 238 can also store log data describing the operation of the microgrid module over time that can be used for further planning and operation of the microgrid module.

In the preferred embodiment, the local data storage 235 stores the rules created by the power management software module 228 from the business parameters. The control software module 225 uses the rules to control the controllable elements 215. Similarly, the power router software module 230 can access the rules to control the power router. Locally storing the rules assists the control software module 225 and the power router software module 230 to respond quickly to changes in power supplied to the microgrid module. For example, the rules can define when the microgrid module will draw power from a power storage device, from the conventional utility grid, or from another microgrid module. More generally, the rules can control various operating modes for the microgrid module including islanding, peak shaving, power conditioning, aggregate load reduction, and the sale of power back to a utility. In alternate embodiments of the invention, software modules and data storage devices can be located either locally or remotely in different arrangements of computing environments.

Although the exemplary embodiments herein are generally described in the context of software modules running on a computing device local to the physical circuitry layer as in FIG. 2, those skilled in the art will recognize that the present invention also can be implemented in conjunction with other program modules in other types of computing environments. Furthermore, those skilled in the art will recognize that the present invention may be implemented in a stand-alone or in a distributed computing environment. In a distributed computing environment, program modules may be physically located in different local and remote memory storage devices. Execution of the program modules may occur locally in a stand-alone manner or remotely m a client/server manner. Examples of such distributed computing environments include local area networks of an office, enterprise-wide computer networks, and the global Internet.

The detailed description of the exemplary embodiments includes processes and symbolic representations of operations by conventional computer components, including processing units, memory storage devices, display devices and input devices. These processes and symbolic representations are the means used by those skilled in the art of computer programming and computer construction to most effectively convey teachings and discoveries to others skilled in the art. These processes and operations may utilize conventional computer components in a distributed computing environment, including remote file servers, remote computer servers, and remote memory storage devices. Each of these conventional distributed computing components is accessible by a processing unit via a communications network.

The present invention includes computer hardware and software which embody the functions described herein and illustrated in the appended flow charts. However, it should be apparent that there could be many different ways of implementing the invention in computer programming, and the invention should not be construed as limited to any one set of computer program instructions. Further, a skilled programmer would be able to write such a computer program to implement the disclosed invention without difficulty based on the flow charts and associated description in the application text, for example. Therefore, disclosure of a particular set of program code instructions is not considered necessary for an adequate understanding of how to make and use the invention. The inventive functionality of the claimed computer hardware and software will be explained in more detail in the following description in conjunction with the other figures in the application.

Figure 2A:
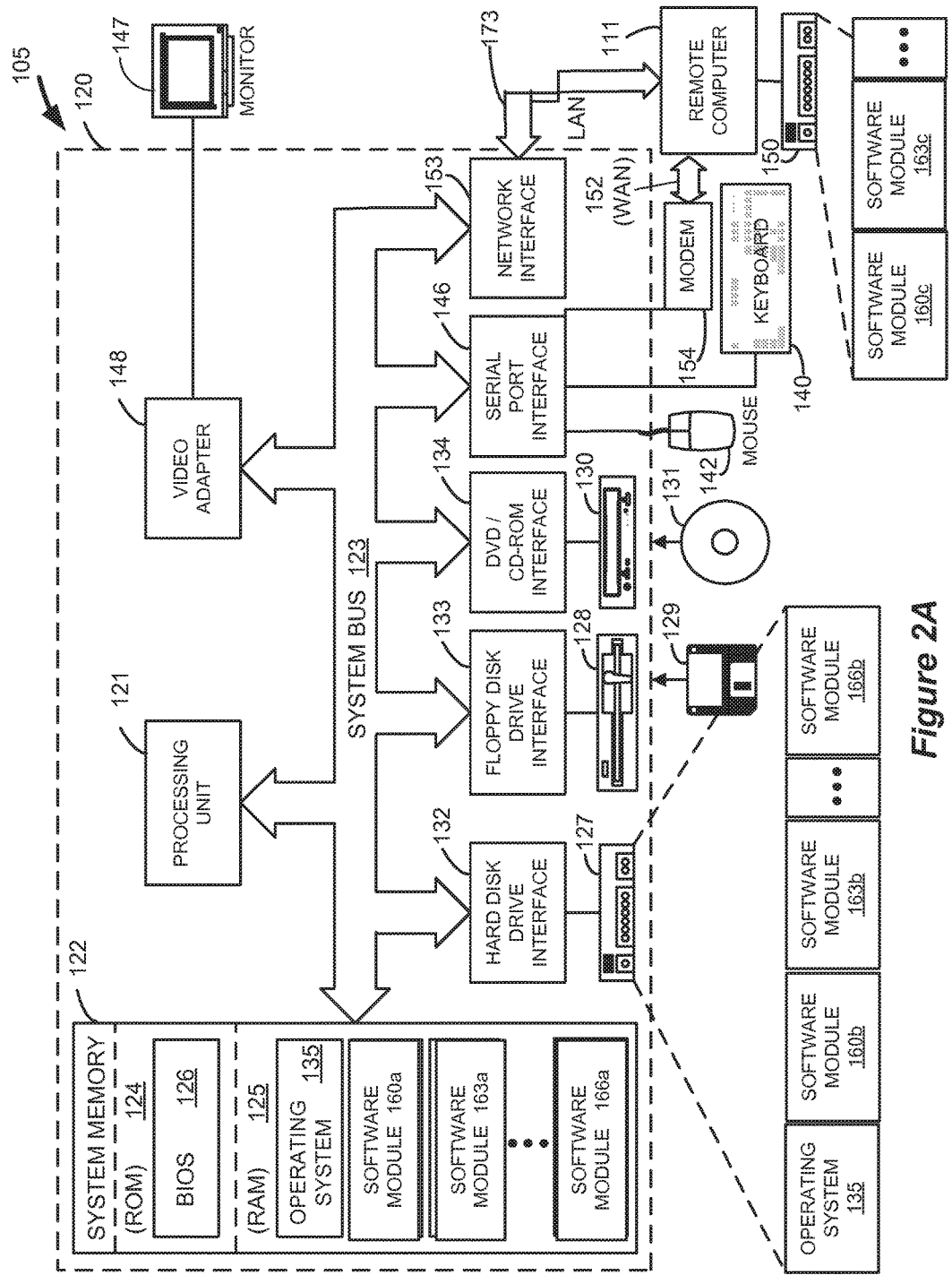
FIG. 2A is a diagram illustrating the components of a computing device in accordance with an exemplary embodiment of the invention.

Referring now to FIG. 2A, aspects of an exemplary computing environment in which the present invention can operate are illustrated. Those skilled in the art will appreciate that FIG. 2A and the associated discussion are intended to provide a brief, general description of the preferred computer hardware and program modules, and that additional information is readily available in the appropriate programming manuals, user's guides, and similar publications.

FIG. 2A illustrates a conventional computing device 120 suitable for supporting the operation of the preferred embodiment of the present invention such as the microgrid computer. As illustrated previously in FIG. 2, the microgrid computer 220 typically comprises multiple software modules. While not required for the computing device implemented in a microgrid module, the computing device 120 illustrated in FIG. 2A operates in a networked environment with logical connections to one or more remote computers 111. The logical connections between computing device 120 and remote computer 111 are represented by a local area network 173 and a wide area network 152. Those of ordinary skill in the art will recognize that in this client/server configuration, the remote computer 111 may function as a file server or computer server.

The computing device 120 includes a processing unit 121, such as "PENTIUM" microprocessors manufactured by Intel Corporation of Santa Clara, Calif. The computing device 120 also includes system memory 122, including read only memory (ROM) 124 and random access memory (RAM) 125, which is connected to the processor 121 by a system bus 123. The preferred computing device 120 utilizes a BIOS 126, which is stored in ROM 124. Those skilled in the art will recognize that the BIOS 126 is a set of basic routines that helps to transfer information between elements within the computing device 120. Those skilled in the art will also appreciate that the present invention may be implemented on computers having other architectures, such as computers that do not use a BIOS, and those that utilize other microprocessors.

Within the computing device 120, a local hard disk drive 127 is connected to the system bus 123 via a hard disk drive interface 132. A floppy disk drive 128, which is used to read or write a floppy disk 129, is connected to the system bus 123 via a floppy disk drive interface 133. A CD-ROM or DVD drive 130, which is used to read a CD-ROM or DVD disk 131, is connected to the system bus 123 via a CD-ROM or DVD interface 134. A user enters commands and information into the computing device 120 by using input devices, such as a keyboard 140 and/or pointing device, such as a mouse 142, which are connected to the system bus 123 via a serial port interface 146. Other types of pointing devices (not shown in FIG. 2A) include track pads, track balls, pens, head trackers, data gloves and other devices suitable for positioning a cursor on a computer monitor 147. The monitor 147 or other kind of display device is connected to the system bus 123 via a video adapter 148.

The remote computer 111 in this networked environment is connected to a remote memory storage device 150. This remote memory storage device 150 is typically a large capacity device such as a hard disk drive, CD-ROM or DVD drive, magneto-optical drive or the like. Those skilled in the art will understand that software modules are provided to the remote computer 111 via computer-readable media. The computing device 120 is connected to the remote computer by a network interface 153, which is used to communicate over the local area network 173.

In an alternative embodiment, the computing device 120 is also connected to the remote computer 111 by a modem 154, which is used to communicate over the wide area network 152, such as the Internet. The modem 154 is connected to the system bus 123 via the serial port interface 146. The modem 154 also can be connected to the public switched telephone network (PSTN) or community antenna television (CATV) network. Although illustrated in FIG. 2A as external to the computing device 120, those of ordinary skill in the art can recognize that the modem 154 may also be internal to the computing device 120, thus communicating directly via the system bus 123. Connection to the remote computer 111 via both the local area network 173 and the wide area network 152 is not required, but merely illustrates alternative methods of providing a communication path between the computing device 120 and the remote computer 111.

Although other internal components of the computing device 120 are not shown, those of ordinary skill in the art will appreciate that such components and the interconnection between them are well known. Accordingly, additional details concerning the internal construction of the computing device 120 need not be disclosed in connection with the present invention.

Those skilled in the art will understand that program modules, such as an operating system 135 and other software modules 160a, 163a and 166a, and data are provided to the computing device 120 via computer-readable media. In the preferred computing device, the computer-readable media include the local or remote memory storage devices, which may include the local hard disk drive 132, floppy disk 129, CD-ROM or DVD 131, RAM 125, ROM 124, and the remote memory storage device 150.

Figure 3:
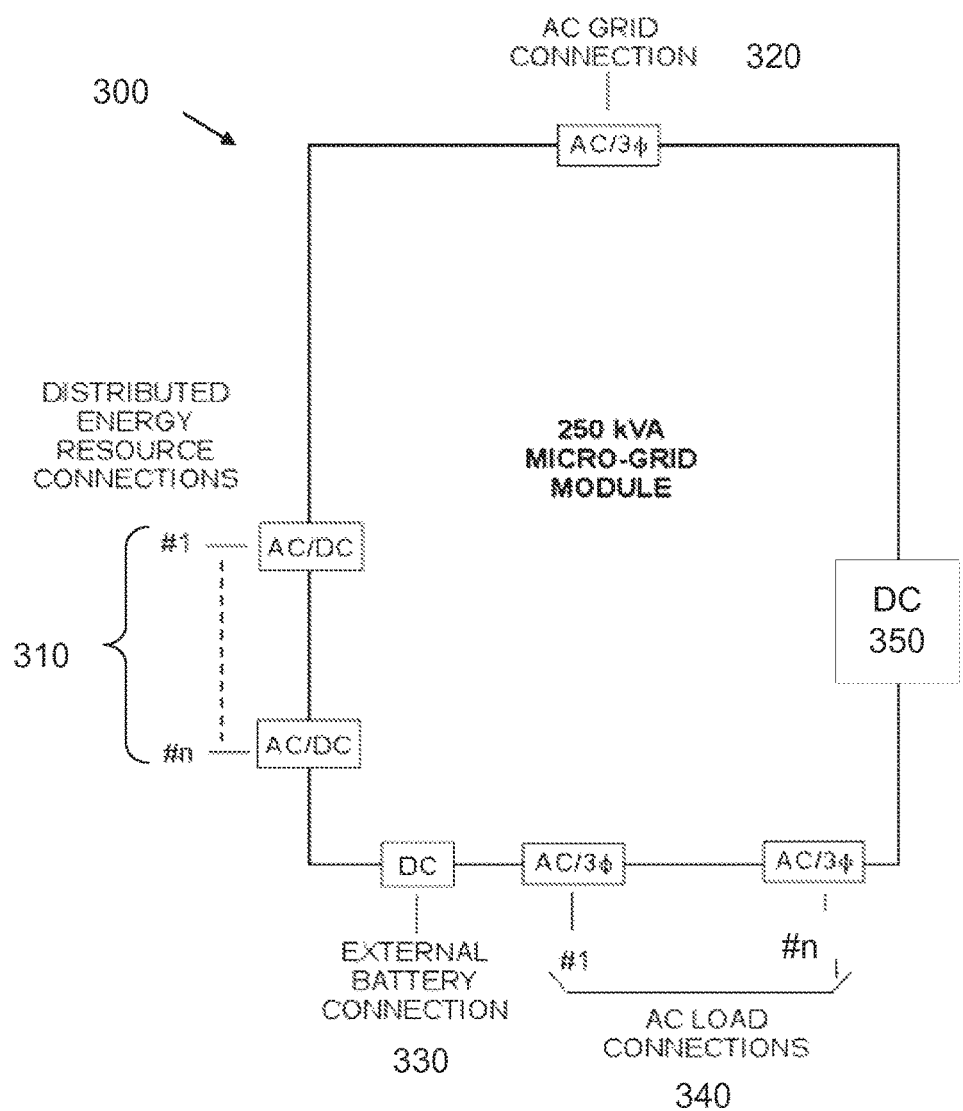
FIG. 3 is a diagram illustrating an overview of the components of the physical circuit layer in accordance with an exemplary embodiment of the present invention.

Referring to FIG. 3, an exemplary microgrid module 300 is shown. As illustrated, the microgrid module 300 may operate from a variety of power sources, including a connection to the local utility grid 320 and one or more distributed energy resources ("DERs") 310 such as internal combustion engine/generator sets, microturbine generators, fuel cells, wind turbines, and photovoltaic arrays. In addition, the microgrid network may have to level the power demands of various loads against the available power sources using energy storage assets 330 which may include batteries (as shown), flywheels, electrochemical capacitors and/or superconducting magnetic energy storage components (SMES).

Although the microgrid module 300 is labeled as a 250 kVA module, that value is merely an example and other microgrid modules within the scope of this invention can be designed to handle smaller or larger amounts of power. The microgrid module may have to provide power to several load systems with a variety of power format requirements including 208 V-3 phase, 480 V-3 phase, 120 V-single phase, 48 VDC, and 300 VDC as examples. As illustrated in FIG. 3, the microgrid module 300 includes one or more AC output buses that supplies power to one or more AC loads 340. Exemplary microgrid module 300 also includes a DC output bus 350 supplying power to a DC load. Processing power to flow from various sources to various load and energy storage assets and from energy storage assets to the loads requires the use of power conversion to interface various incoming and outgoing power formats.

The exemplary embodiments set forth in FIGS. 4A-4D illustrate in greater detail the components of the microgrid module 300 shown in FIG. 3. FIGS. 4A-4D are broken up into four more detailed components of the overview shown in FIG. 3. Those of skill in the art will recognize that the embodiments shown in FIGS. 4A-4D may be modified by adding, removing, or rearranging conventional electrical components without departing from the scope of the invention.

Figure 4A:
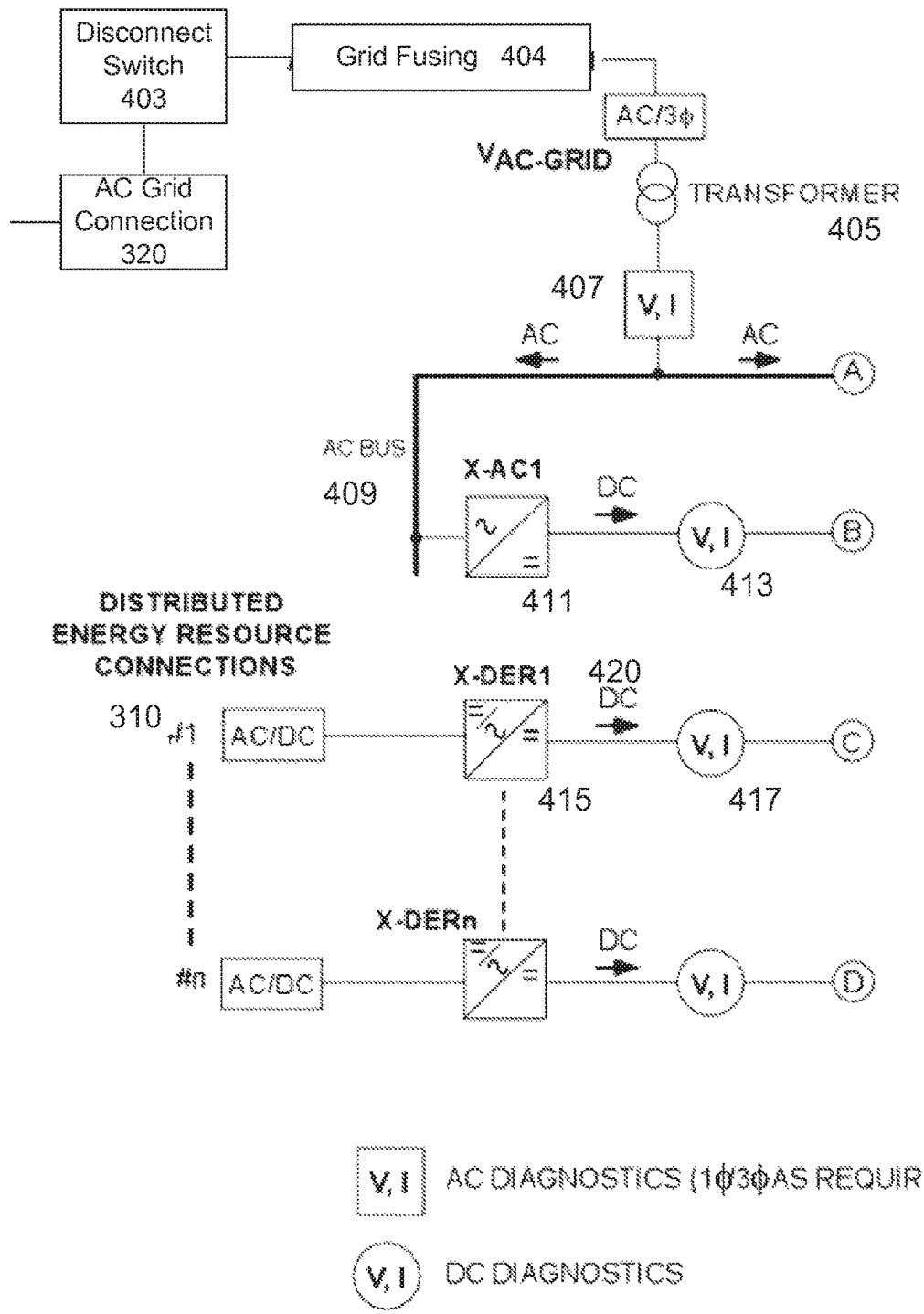
FIGS. 4A through 4D are diagrams illustrating portions of the components of the physical circuit layer in accordance with an exemplary embodiment of the present invention.

Turning to FIG. 4A, DERs 310 are illustrated as connected to DC input bus 420. As illustrated in FIG. 4A, the microgrid module may comprise one or more DC input buses 420 and may be coupled to one or more DERs 310. As explained previously, the DERs 310 can be one or more of a variety of energy sources, including conventional and renewable energy sources. If the DER 310 is an AC power source, a converter 415 can be used to convert the AC power to DC power for transmission onto the DC input bus 420. The DC input bus 420 can also be coupled to a DC diagnostic element 417. The DC diagnostic element 417 can comprise one or more sensors that can communicate with the control software module 225.

FIG. 4A also illustrates an exemplary AC grid connection 320 that connects to the AC grid input bus 409 of the microgrid module. The connection with the AC grid allows power from the conventional utility grid to be fed to the microgrid module. In certain embodiments a transformer 405 will be necessary to adjust the voltage of the power flowing from the utility grid to the microgrid module. An AC diagnostic module 407 can also be located at the AC grid connection 320. The AC diagnostic module can comprise one or more sensors in communication with the control software module 225. The AC diagnostic module 407 can provide data to the control software module 225 about the flow of power from the utility grid to the microgrid module and the control software module 225 can control the power flow at this connection with one or more controllable elements in the physical circuitry layer. The AC grid input bus also can be coupled to converter 411 for converting AC power to DC power that flows to the DC input bus 420. The DC input bus receiving power from the AC grid input bus 409 can also comprise another DC diagnostic element 413.

FIG. 4A also illustrates exemplary elements for disconnecting the microgrid module from the AC grid. For example, disconnect switch 403 and grid fusing 404 can be used to disconnect the microgrid module from the AC grid. In one embodiment, the disconnect switch 403 can be controlled by the control software module 225 or be activated by a person when it is necessary to disconnect the microgrid module from the AC grid. Grid fusing 404 can be implemented as an added safety measure capable of disconnecting the microgrid module from the AC grid in the event of a dangerous situation. Although not illustrated in FIGS. 3 and 4A-4D, similar disconnect switches and fuses can be implemented at other points where the microgrid module connects to power sources, loads or other microgrid modules. These disconnect switches and fuses can be implemented to allow the control software module, the power router software module, or a person to quickly disconnect the microgrid module when necessary.

Figure 4B:
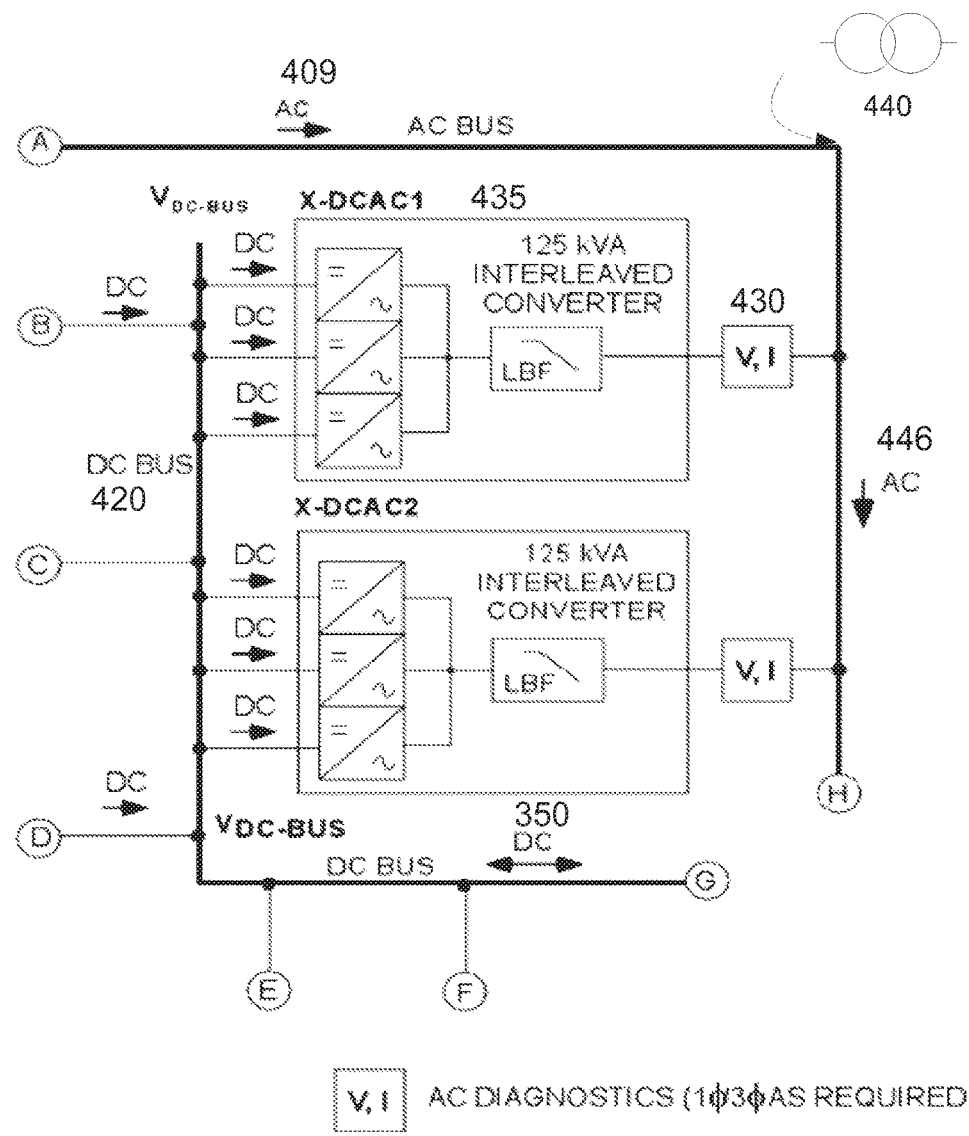
Figure 4C:
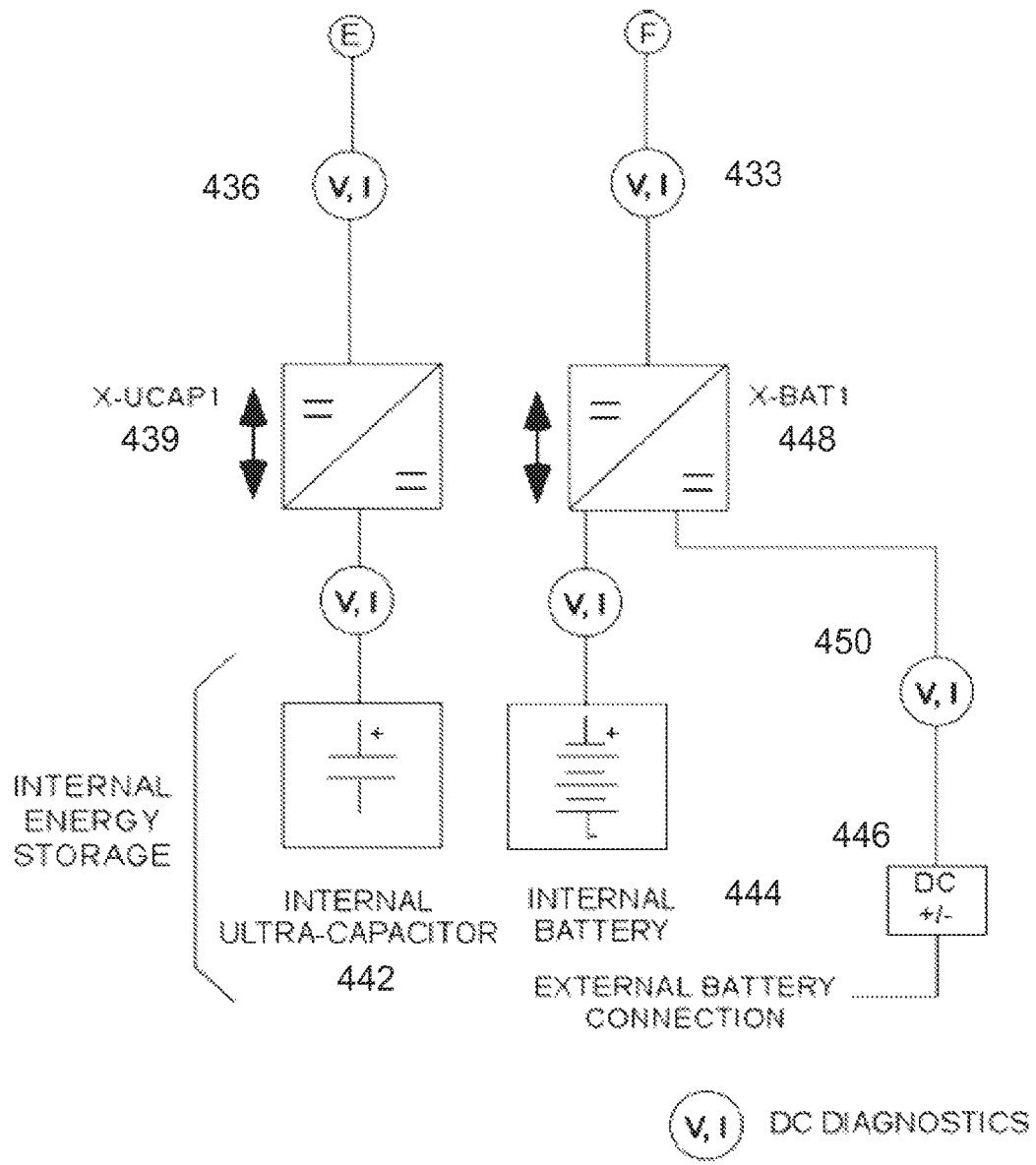
Figure 4D:
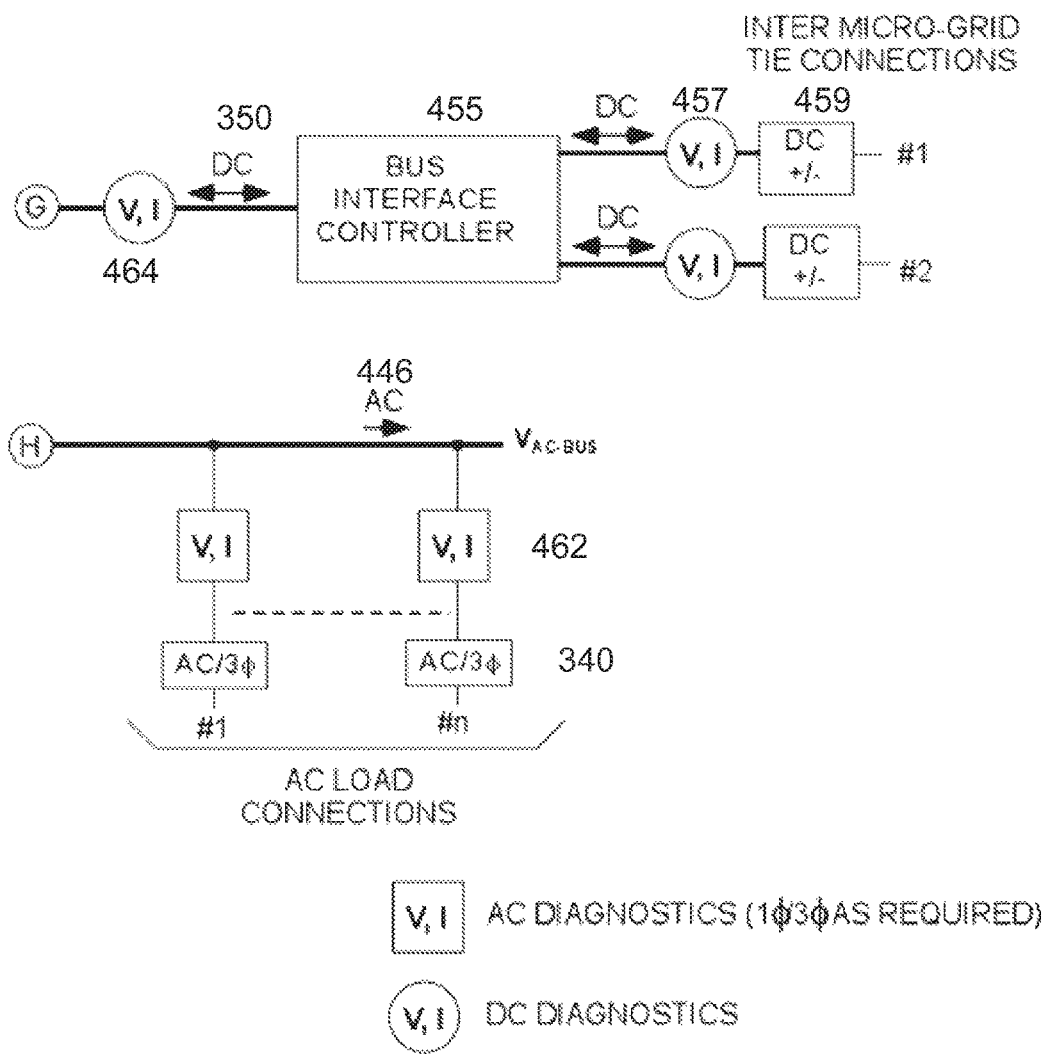

Referring to the exemplary illustration in FIG. 4B, one can see that connections A, B, C, and D from FIG. 4A have corresponding connection points A, B, C, and D in FIG. 4B. These connection points at A, B, C, and D do not represent physical elements of the microgrid module, but merely illustrate the connection points between FIGS. 4A and 4B. FIGS. 4C and 4D have a similar arrangement and FIGS. 4A-4D are intended to provide a more detailed illustration of the overview of the exemplary embodiment shown in FIG. 3.

In FIG. 4B, the DC input bus 420 has two primary connections. First, the DC input bus 420 can be coupled to a DC output bus 350 for supplying DC power from the microgrid module. The DC input bus 420 and DC output bus 350 may be linked through a power converter (not shown in FIG. 4B) if needed to adjust the input and output voltages. While the embodiment described in connection with FIGS. 4A through 4D includes a DC input bus and a DC output bus, those of skill in the art will recognize that two distinct DC buses are not required. For example, other microgrid modules may comprise a single DC bus that receives DC power at one point and delivers DC power at another point.

Second, the DC input bus can feed one or more converters 435 implemented to convert DC power to AC power for distribution on the AC output bus 446. The AC output bus 446 is coupled to the AC grid input bus 409 and a transformer 440 can be placed between the AC grid input bus 409 and the AC output bus 446 if needed to adjust the input and output voltages. As illustrated in exemplary FIG. 4B, an AC diagnostic element 430 can be placed between converter 435 and the AC output bus 446. The AC diagnostic element 430 can comprise one or more sensors allowing the control software module 225 to monitor and control the operation of the physical circuit layer of the microgrid module.

FIG. 4B includes connection points E and F to the elements of FIG. 4C. Exemplary FIG. 4C shows additional components of the exemplary microgrid module including internal ultra-capacitor 442 and internal battery 444. In alternate embodiments, the internal energy storage components shown in FIG. 4C may not be internal parts of the microgrid module but may be external and coupled to the microgrid module. For example, as shown in FIG. 4C, the DC output bus 350 (not shown in FIG. 4C) may be coupled to an external battery via connection 446. The energy storage devices shown in FIG. 4C are coupled to the DC output bus 350 via converters 439 and 448. These converters function to convert the DC voltage level associated with the energy storage elements with the voltage level of the DC output bus 350. Specifically, the voltage level associated with each energy storage device may be substantially different from that of the DC bus. Moreover, the voltage levels associated with each energy storage device may vary substantially depending on the state-of-charge of the energy storage device. In general, as an energy storage device is charged, its associated voltage increases. Similarly, in general, as an energy storage device is discharged while delivering energy to the microgrid module, the associated voltage decreases. Power converters 439 and 448 can adjust voltage levels so that the voltage level of the DC output bus 350 and the energy storage devices is consistent.

The energy storage devices also are coupled to one or more DC diagnostic elements 436, 433 and 450. As with other diagnostic elements previously discussed, the DC diagnostic elements 436, 433 and 450 can comprise one or more sensors in communication with the control software module 225. The energy storage devices illustrated in FIG. 4C are merely representative and those of skill in the art will appreciate that other arrangements of energy storage devices can be placed either internal or external to the microgrid module and perform a similar function of storing energy provided by the microgrid module and subsequently providing it back to the microgrid module as needed.

Referring to FIG. 4D, exemplary elements connected to points G and H from FIG. 4B are illustrated. Point G shows the connection of the DC output bus 350 to a bus interface controller 455. The bus interface controller 455 controls the flow of power between the microgrid module illustrated in FIGS. 4A-4D and one or more other microgrid modules. As described in further detail below, multiple microgrid modules can be coupled together and the bus interface controller (or power router) 455 manages the flow of power between the coupled microgrid modules. The power router 455 typically comprises control and power converter circuits that communicate with a software module such as the power router software module 230 illustrated in FIG. 2. In certain embodiments, the power router 455 may not be part of the microgrid module, but can be coupled to the microgrid module. Moreover, in certain embodiments the power router 455 can comprise its own power router software module. One or more microgrid tie connections 459 connect the DC output bus 350 to other microgrid modules. The DC output bus can also comprise one or more DC diagnostic elements 464 and 457 which can perform sensing functions as described previously.

FIG. 4D also illustrates exemplary elements connected to the AC output bus 446 at point H. One or more AC load connections 340 can be coupled to the AC output bus 446. The 3-phase AC load connection shown in FIG. 4D is merely exemplary and a variety of AC loads having different voltages and phase combinations can be connected to the AC output bus 446 of the microgrid module. The AC load connections can also comprise AC diagnostic elements similar to those described previously.

Those of skill in the art will recognize that the microgrid illustrated in FIGS. 3 and 4A-4D is merely exemplary and that other microgrids can be designed in different arrangements within the scope of this invention. For example, in alternate embodiments of the invention, the microgrid may comprise different distributed energy resources, different power converters and transformers, or the microgrid may not be connected to the conventional utility power grid. Likewise, alternate embodiments of the invention may not include energy storage devices or the energy storage devices may be only internal to the microgrid module. In other embodiments, the microgrid computer can be implemented in a variety of computing environments and can include other software such as the power router software module. In yet other embodiments, the power router software module can be installed on the power router or installed on a separate computing device coupled to the microgrid module.

Figure 5:
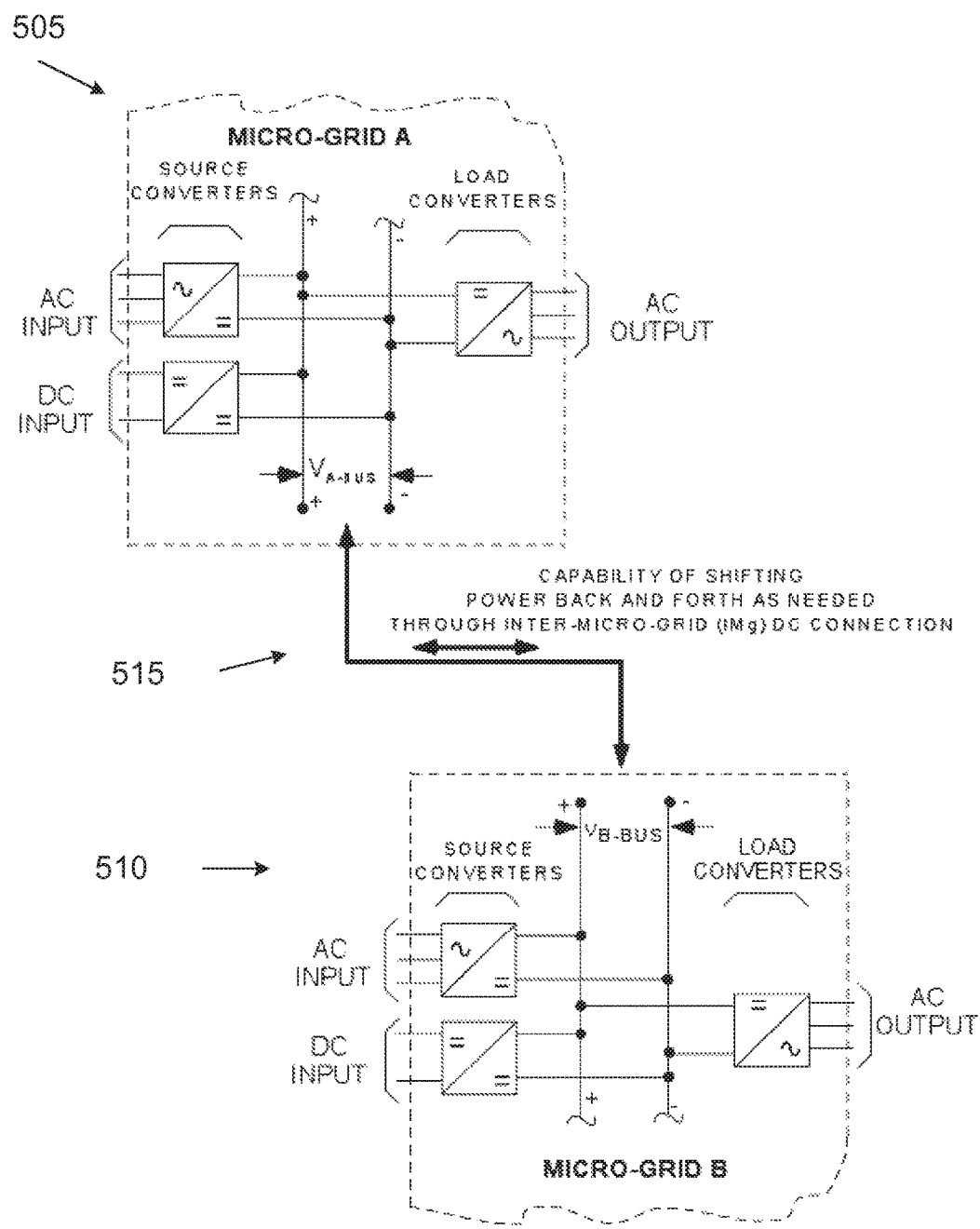
FIG. 5 is a diagram illustrating the connection of two microgrid modules via an inter-microgrid connection in accordance with an exemplary embodiment of the invention.

Referring to FIG. 5, microgrid A 505 and microgrid B 510 are shown coupled together by inter-microgrid connection 515 in accordance with an exemplary embodiment of the invention. Microgrid A 505 and microgrid B 510 are simplified representations of microgrid modules and do not illustrate all of the components discussed previously in connection with FIGS. 4A-4D. As shown in FIG. 5, the inter-microgrid connection 515 is typically bidirectional in that it permits power flow to and from either microgrid module. In the preferred embodiment, when the two microgrid modules are in operation, the microgrid module in need of power can receive power from the other microgrid module. Either microgrid module is capable of providing power to or receiving power from the other microgrid module depending on the instantaneous power needs and availabilities. The direction of power flow can be controlled in real time and near-instantaneously by the power router software module which can be installed in the power router, on the microgrid computer, or on a separate computing device coupled to the power router.

In the simplified representation of FIG. 5, the inter-microgrid connection is shown coupled to a bus in each microgrid. While not shown in FIG. 5, a power router, as shown in FIG. 4D, typically connects the DC bus of each microgrid module to the inter-microgrid connection. Furthermore, while not specified in FIG. 5, the bus can be either an AC bus or a DC bus, however, in the preferred embodiment the inter-microgrid connection is coupled to a DC bus in each microgrid module.

Figure 6:
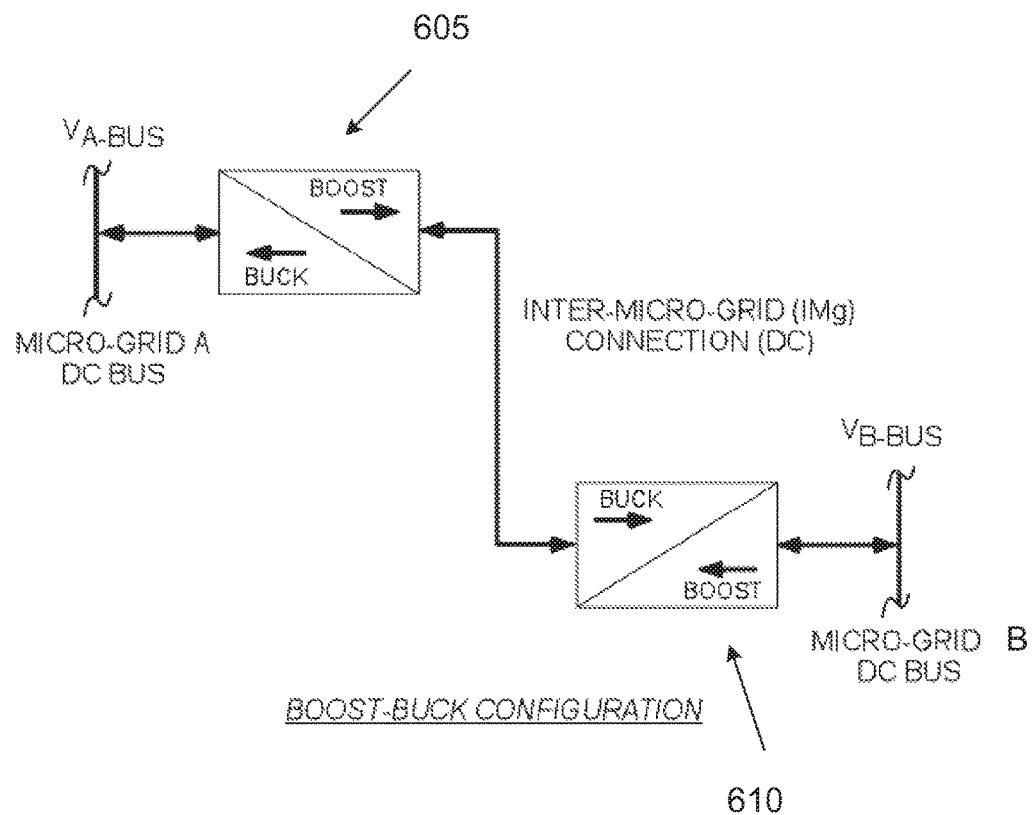
FIG. 6 is a diagram illustrating the boost/buck components of power router elements of two microgrid modules in accordance with another exemplary embodiment of the invention.

Turning to FIG. 6, exemplary boost-buck components of the power router are illustrated. Specifically, FIG. 6 shows boost-buck component 605 of a power router (not shown) of microgrid module A and boost-buck component 610 of a power router (not shown) of microgrid module B. FIG. 6 also illustrates the inter-microgrid connection between the two boost-buck components. In this exemplary embodiment, boost-buck component 605 receives power from the DC bus of microgrid module A and increases the voltage of the DC power before transmitting it on the inter-microgrid connection to microgrid module B. When boost-buck component 610 receives DC power from microgrid module A, it decreases the voltage of the DC power before it is transmitted to the DC bus of microgrid module B. Similarly, when DC power is transmitted from microgrid module B to microgrid module A, the voltage is increased by boost-buck component 610 and decreased by boost-buck component 605. Although the different microgrid modules may have different operating conditions, the boost-buck component enables the different microgrid modules to share power. Therefore, if microgrid module A and microgrid module B are operating at different voltages, the boost-buck components can be used to adjust the voltage of the power transmitted between the microgrid modules.

Figure 7:
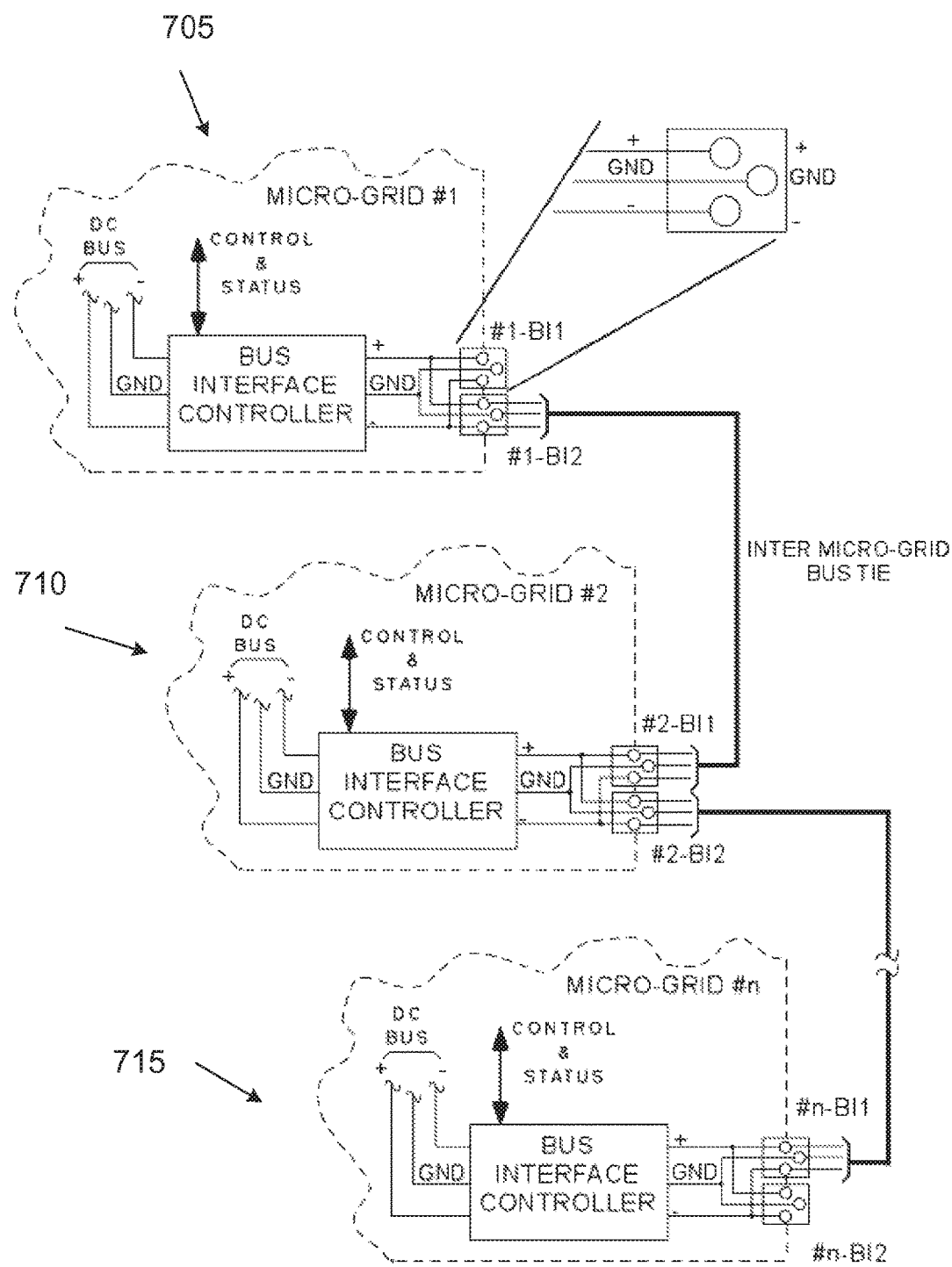
FIG. 7 is a diagram illustrating the connection of multiple microgrid modules in accordance with an exemplary embodiment of the present invention.

Referring to FIG. 7, an exemplary embodiment of the invention is illustrated with multiple microgrid modules coupled via inter-microgrid connections or bus ties. In the exemplary embodiment shown in FIG. 7, each microgrid module 705, 710, and 715 comprises a bus interface controller, or power router, with two connection points labeled BI1 and BI2. The two connection points enable each microgrid module to be coupled to two other microgrid modules, such as in the series configuration shown in FIG. 7. In other embodiments of the invention, the power router can comprise fewer or more connection points as needed to support the particular application. FIG. 7 also shows a bi-directional arrow illustrating the communication of control and status information between the bus interface microgrid controller and the power router software module (not shown).

Figure 8:
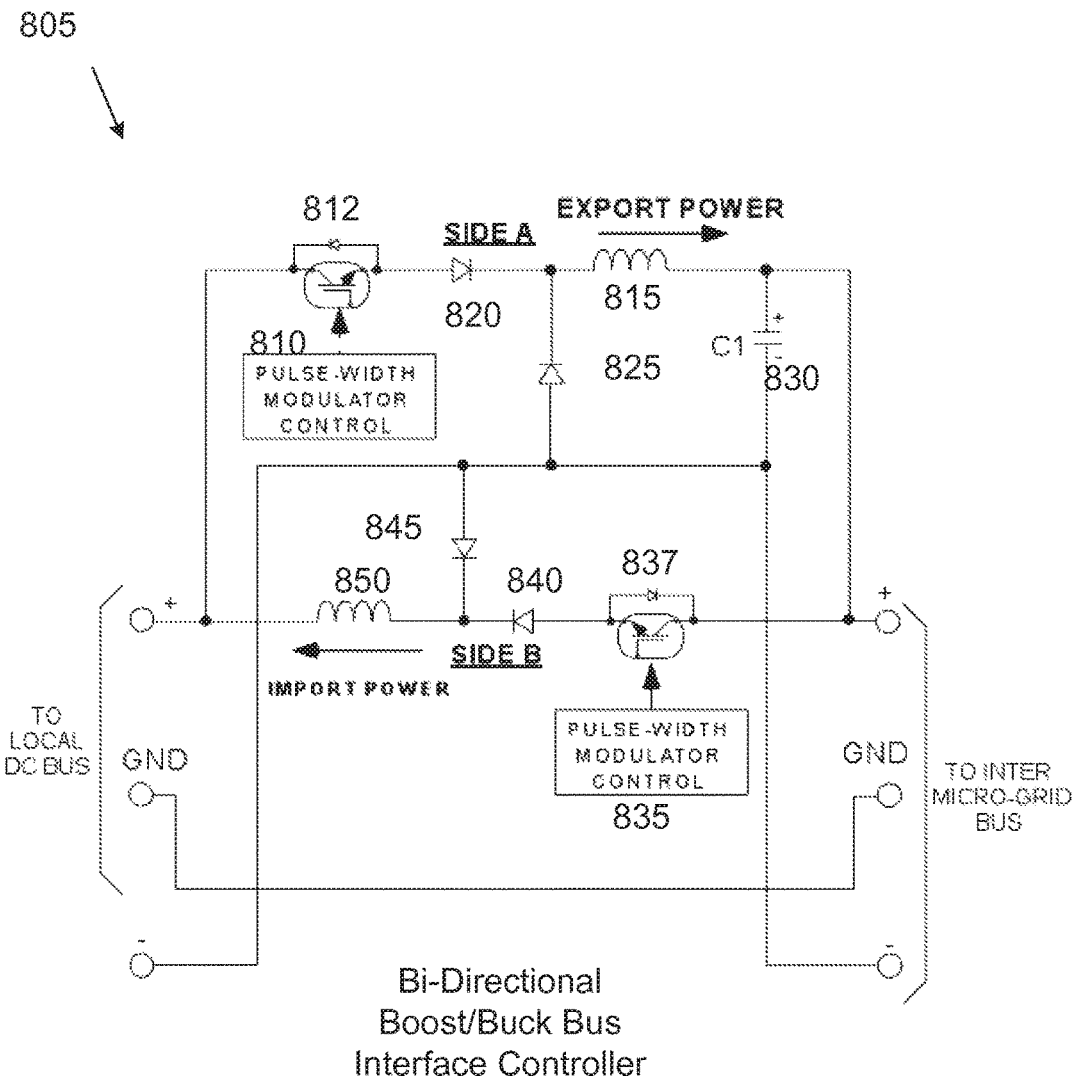
FIG. 8 is a diagram illustrating the components of an exemplary power router element of a microgrid module using a bi-directional boost/buck controller in accordance with an exemplary embodiment of the present invention.

Turning to FIG. 8, an exemplary boost-buck component 805 of an exemplary power router is illustrated. As shown in FIG. 8, exemplary boost-buck component 805 comprises two sides, side A controls power exported from the microgrid to the inter-microgrid bus and side B controls power imported from the inter-microgrid bus to the microgrid. Side A comprises a pulse-width modulator control 810, diodes 820 and 825, inductor 815, and capacitor 830. The components of side A are used to adjust the voltage of the power exported to the inter-microgrid bus and, as described previously, in the preferred embodiment the voltage of the power is increased prior to exporting the power. Side B comprises a pulse-width modulator control 835, diodes 840 and 845, and inductor 850. The components of side B are used to adjust the voltage of the power imported from the inter-microgrid bus to the local bus of the microgrid module and, as described previously, in the preferred embodiment the voltage of the imported power is decreased by the boost buck component 805.

The operation of Side A and Side B in exemplary component 805 is similar except each side controls the flow of power in opposite directions as discussed above. The detailed operation of each side is explained here by considering the operation of Side A. Side A operates to export power from the microgrid module to the inter-microgrid bus. Specifically, the DC voltage of the micro grid bus appears across the +/− terminals at the left side of the diagram. The pulse width modulator control 810 causes the binary switching of switching element 812. The switching element 812 is switched in a manner which causes the build up of current in inductor 815. Specifically, when switching element 812 is turned on, current is supplied from the microgrid and increases in inductor 815.

The level of current flowing in inductor 815 continues to increase proportionally to the voltage difference between the input and output terminals of the boost/buck circuit and continues to increase for as long as switch element 812 is turned on. When the current on inductor 815 reaches some desired level, switching element 812 is turned off and the current increase ceases. Once the switching element 812 is turned off, current flowing in inductor 815 is directed through free-wheeling diode 825. During the interval when switching element 812 is turned off, the current in the inductor continues to flow into the inter-microgrid bus by virtue of the free-wheeling action of diode 825. As power is delivered to the inter-microgrid bus, the current level flowing in inductor 815 decreases. Once the current level in inductor 815 reaches some minimum value, switching element 812 is once again turned on, essentially recharging the inductor 815 back to some maximum current level required to maintain the appropriate average power flow from the microgrid to the inter-microgrid bus.

Generally, the switching element 812 is switched at a multi-kilohertz rate to effect precise control of the average current flow through inductor 815. Specifically, the average current flowing through inductor 815 is controlled by the pulse width modulation control circuit 810 based upon the desired amount of power that is to be transferred from the microgrid to the inter-microgrid bus.

The operation of Side B of the interface controller is similar to that of Side A with the exception that power in being imported from the inter-microgrid bus to the microgrid based upon the control of the average current that is flowing in inductor 815. The average current flowing in inductor 815 is controlled by the switching action of switching element 837 which is controlled by pulsed width modulator control circuit 835.

The direction of the power flow (into or out of the microgrid) is determined by the power router software module and can be subject to a variety of factors including the instantaneous state of power demand, power delivered, and business rules.

Figure 9:
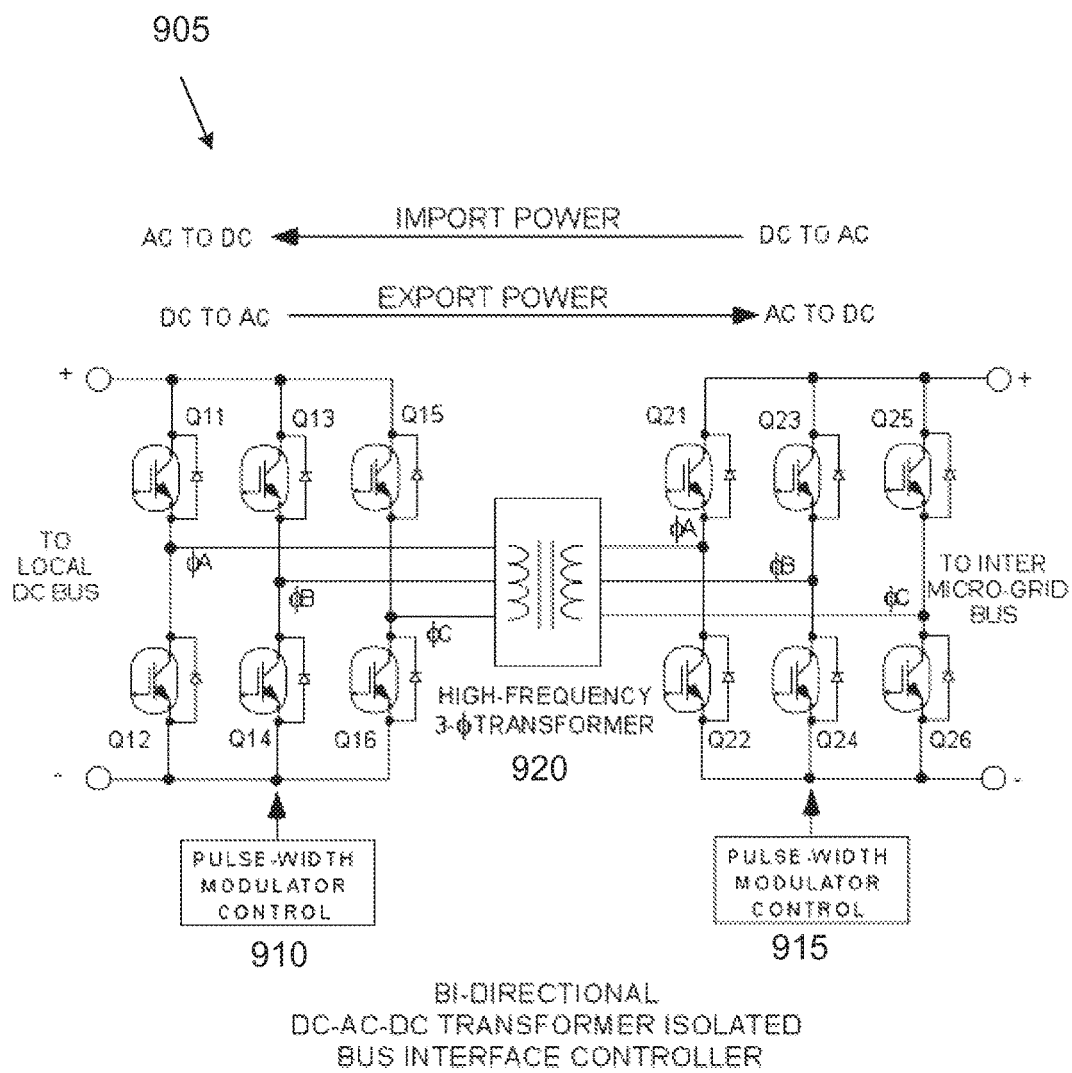
FIG. 9 is a diagram illustrating the components of an exemplary power router element of a microgrid module using a back-to-back three-phase switching bridges in accordance with an exemplary embodiment of the present invention.

FIG. 9 illustrates an alternative embodiment of a power router in accordance with the present invention. The power router 905 illustrated in FIG. 9 is capable of converting DC power from the local DC bus of the microgrid to AC power before transmitting the AC power on the inter-microgrid bus. Exemplary power router 905 is beneficial for applications where the microgrid modules are separated by relatively long distances (for example, on the order of hundreds of feet) and the power must be transmitted over a long distance on the inter-microgrid bus. In such situations, there may be a significant difference in the DC bus voltage levels of each of the microgrid modules. Moreover, different microgrids may have been designed to operate with significantly different DC bus voltages. In both of these situations, it may be necessary to provide additional voltage matching and/or voltage reference isolation capability than that provided by the bus interface controller 805.

Exemplary power router 905 comprises pulse-width modulator controls 910 and 915 separated by transformer 920, wherein the transformer 920 comprises two back-to-back three-phase voltage source pulse width converters. The two converters are essentially mirror images of each other, both capable of converting an AC, three-phase waveform to a DC voltage (active rectification) or a DC voltage to an AC three-phase waveform (inversion). Either converter can function in the AC to DC mode or DC to AC mode. However, when one converter operates in the DC to AC mode, the other converter will operate in the AC to DC mode. As such, the DC voltage from the microgrid can be converted to an AC three-phase waveform and subsequently converted back to a DC voltage for transmission of power onto the inter-microgrid bus. Conversely, the DC voltage on the inter-microgrid bus can be converted to an AC three-phase waveform and subsequently converted back to a DC voltage so that power can be transferred to the microgrid module. Large differences in DC voltages on the DC bus of the microgrid and the inter-microgrid bus can be accommodated by the high-frequency transformer 920 that is interposed between the two converters.

The operation of the exemplary DC-AC-DC transformer can be described by considering the export of power from a microgrid onto the inter-microgrid bus. In this situation, the converter circuitry on the left side of transformer 920 functions as an inverter, converting the DC voltage supplied by the microgrid to an AC three-phase waveform. This conversion takes place by switching switch elements Q11-Q16 in a proper sequence to provide a three-phase waveform to the primary of the high-frequency transformer 920. Pulse width modulation control circuit 910 provides the signals to properly switch the switching elements Q11-Q16 to provide the proper three-phase waveform to the primary of the high-frequency transformer 920. The converter circuitry on the right side of high-frequency transformer 920 subsequently functions as an active rectifier circuit which converts the three-phase waveform from the secondary of the high-frequency transformer 920. Active rectification occurs when switching elements Q21-Q26 are switched in the appropriate sequence to effect the rectification of the AC waveform at the secondary of the high-frequency transformer 920. Pulse width modulation control circuit 915 provides signals to properly switch the switching elements Q21-Q26 to achieve the active rectification function.

The operation of the power router 905 when power is being imported to a microgrid module from the inter-microgrid bus is similar to that explained above with the exception that the converter circuitry on the right side of high-frequency transformer 920 functions as a DC to AC inverter and the converter circuitry on the left side of the high-frequency transformer 920 functions as the active rectifier. The converter circuitry on the left side of high frequency transformer 920 functions as an active rectifier delivering power to the DC bus of the microgrid module.

In exemplary power router 905, the direction of the power flow (into or out of the microgrid) is determined by the power router software module and can be subject to a variety of factors including the instantaneous state of power demand, power delivered, and business rules.

Figure 10:
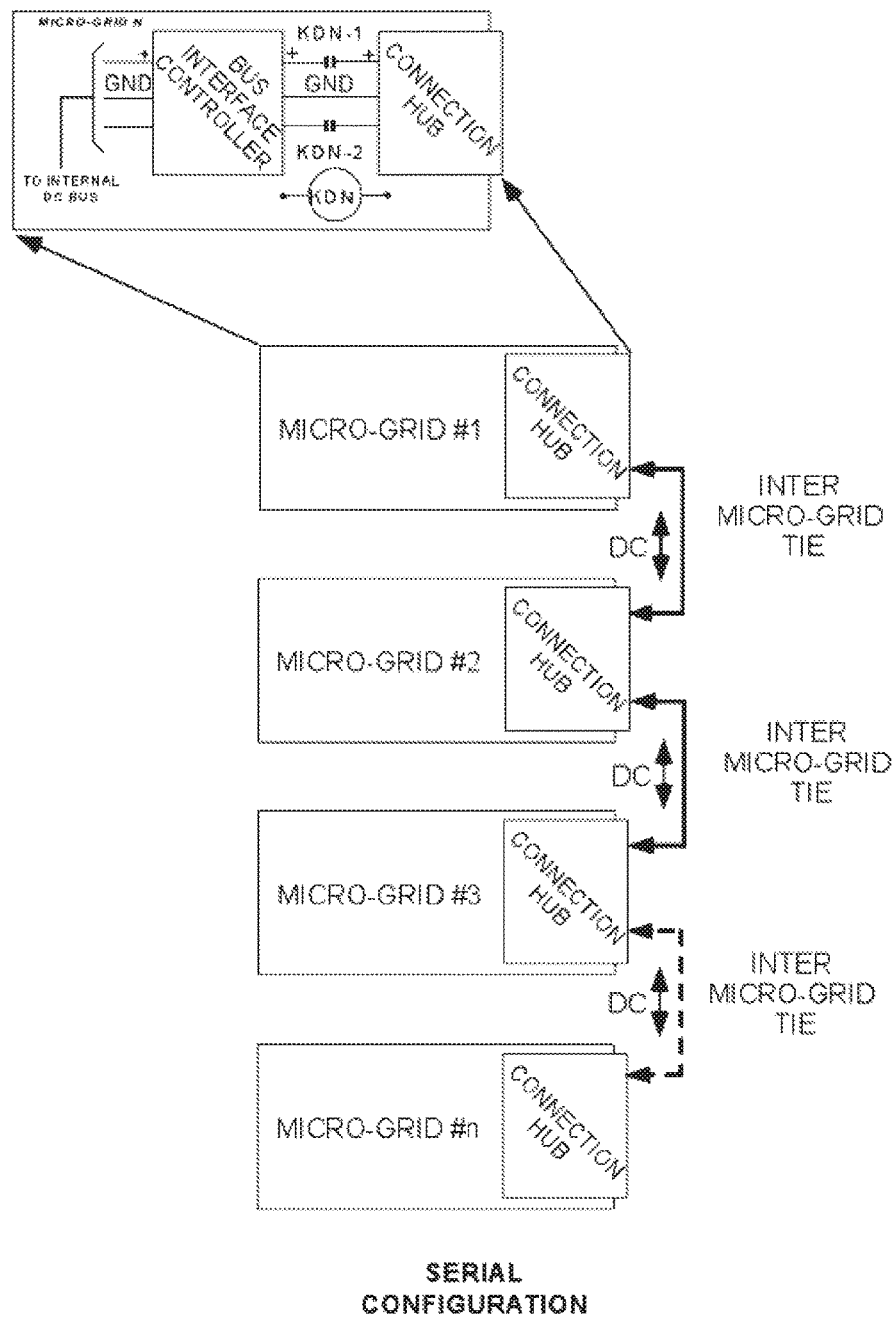
FIG. 10 is a diagram illustrating a serial configuration of a plurality of microgrid modules in accordance with an exemplary embodiment of the present invention.
Figure 11:
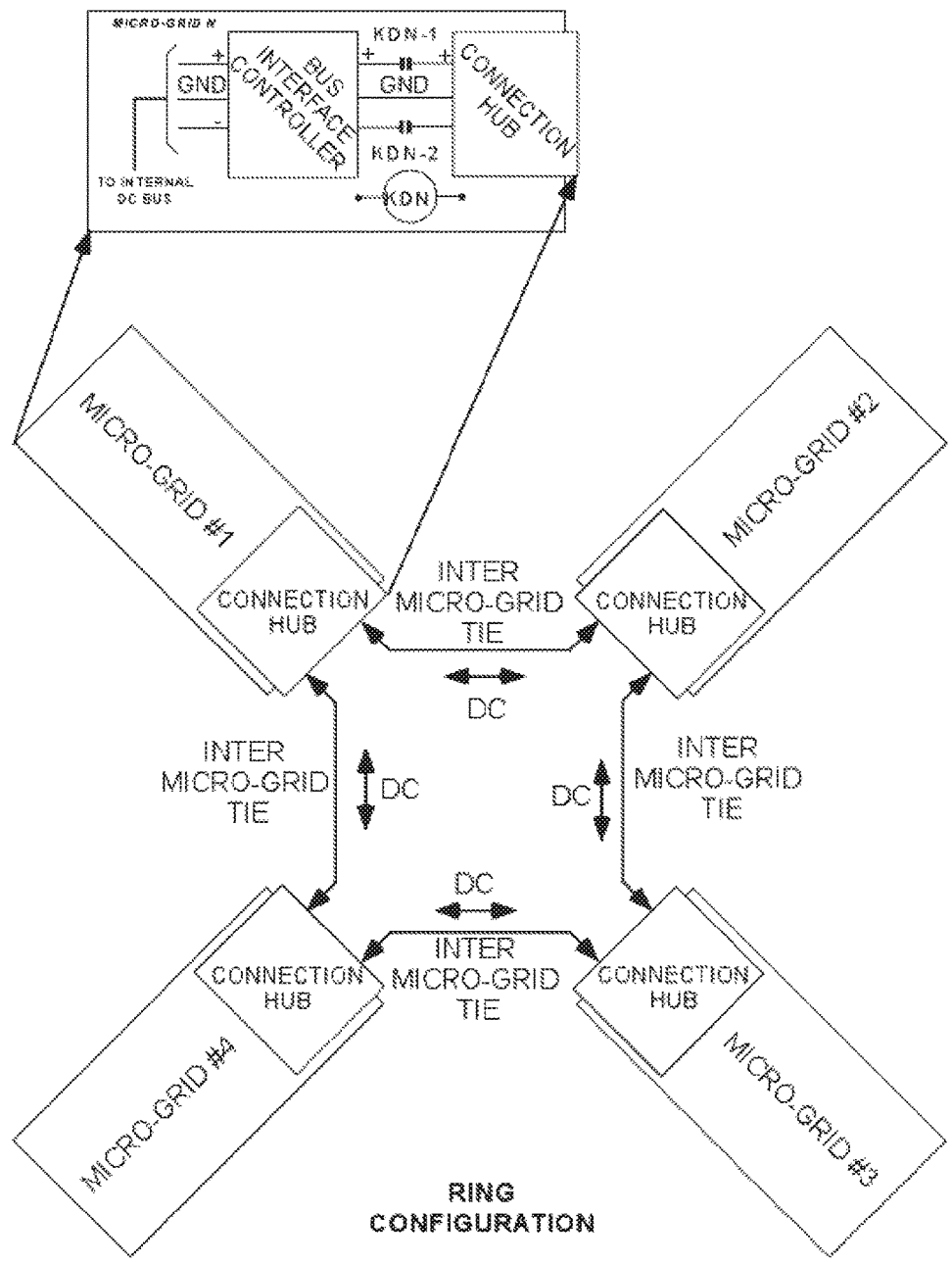
FIG. 11 is a diagram illustrating a ring configuration of a plurality of microgrid modules in accordance with an exemplary embodiment of the present invention.
Figure 12:
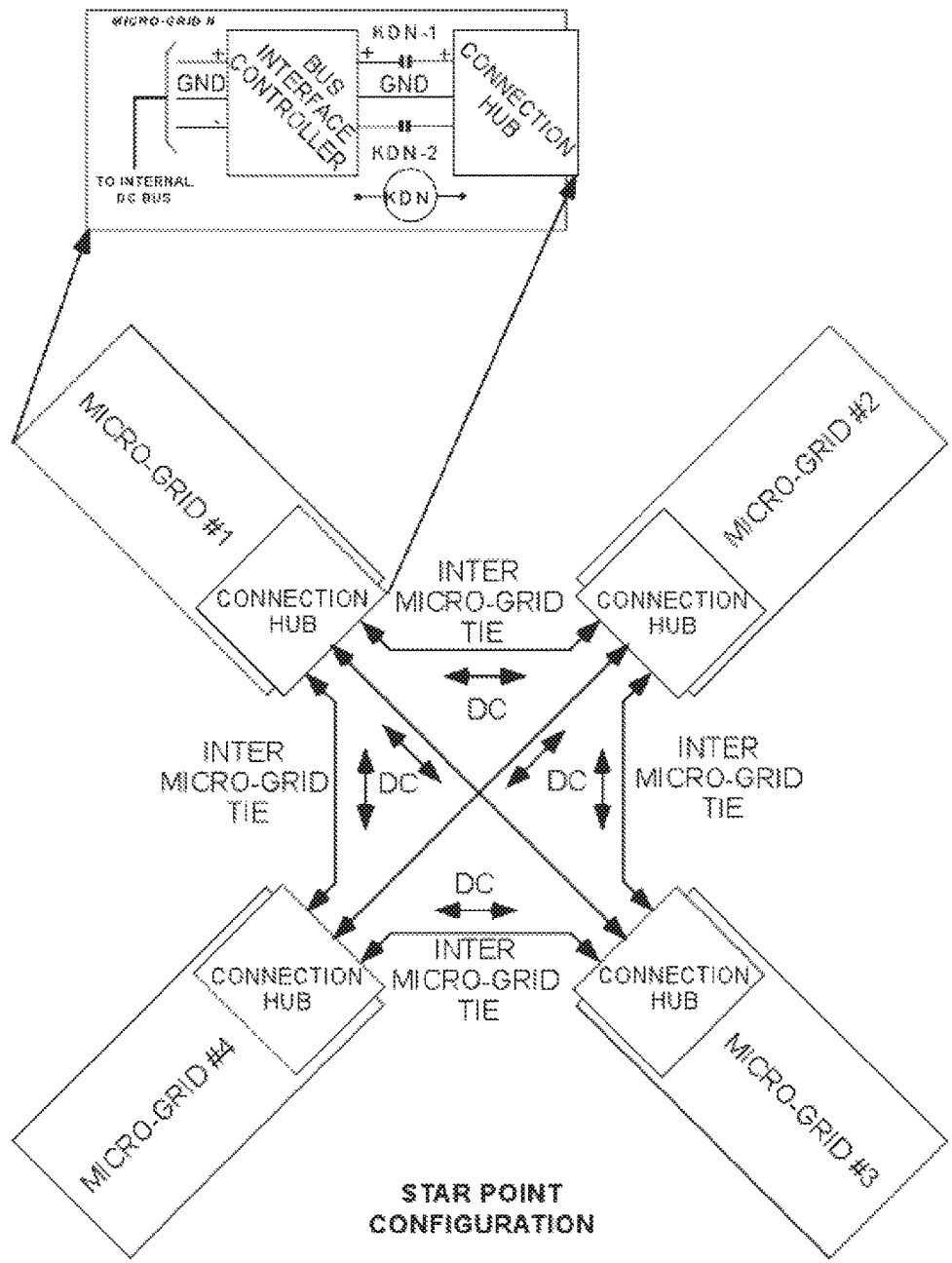
FIG. 12 is a diagram illustrating a star point configuration of a plurality of microgrid modules in accordance with an exemplary embodiment of the present invention.
Figure 13:
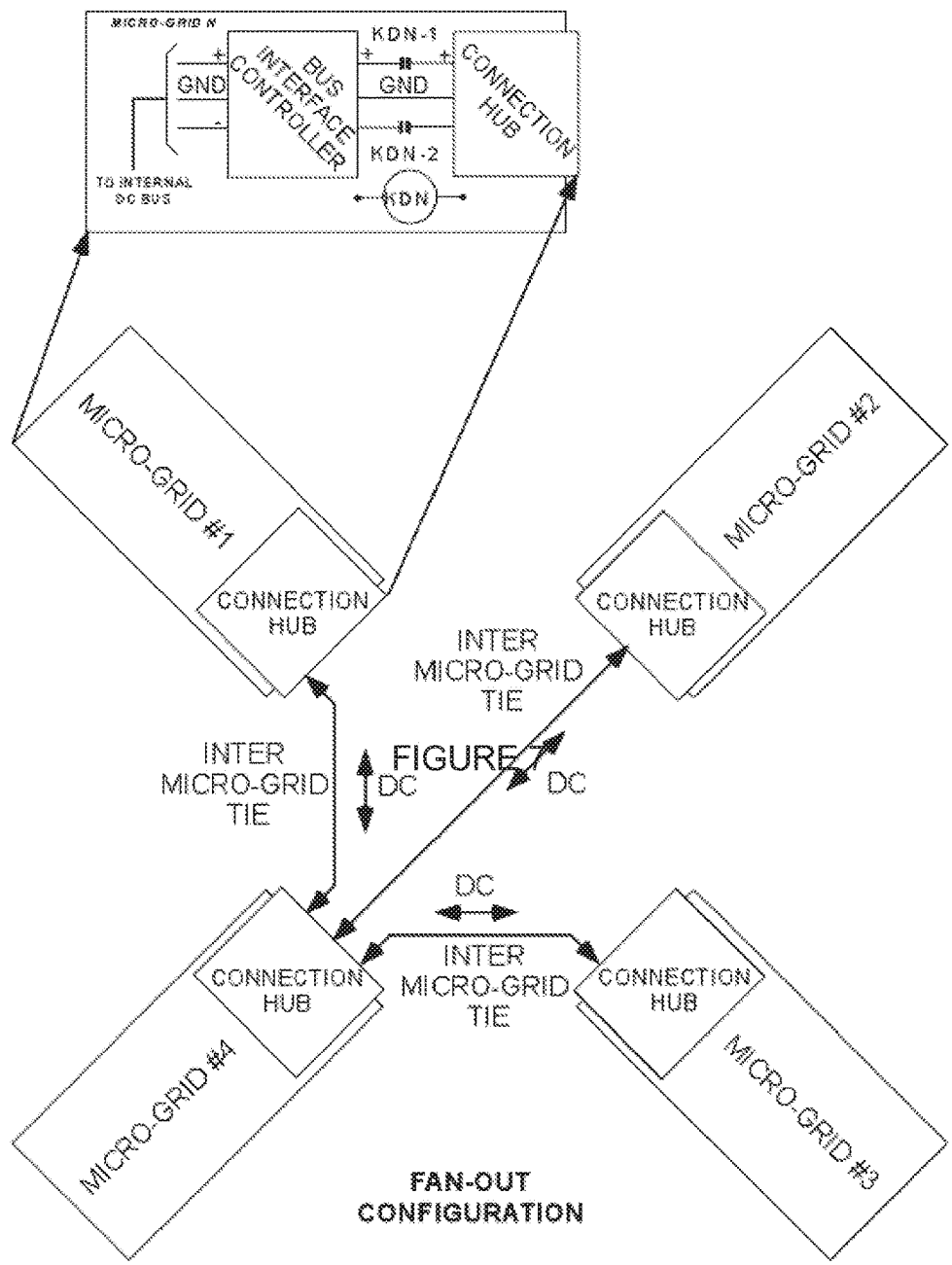
FIG. 13 is a diagram illustrating a fan-out configuration of a plurality of microgrid modules in accordance with an exemplary embodiment of the present invention.
Figure 14:
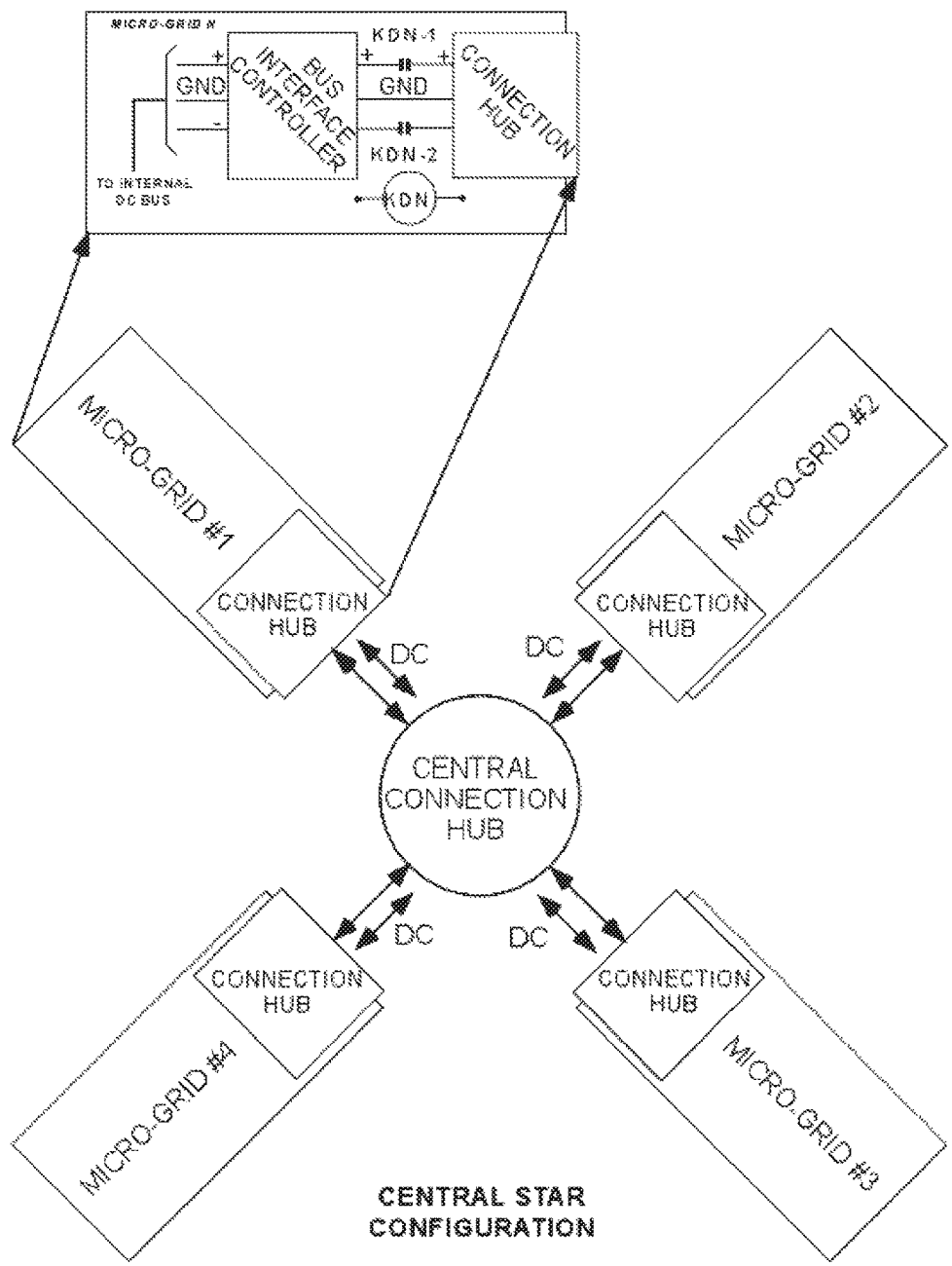
FIG. 14 is a diagram illustrating a central star configuration of a plurality of microgrid modules in accordance with an exemplary embodiment of the present invention.

FIGS. 10 through 14 illustrate different exemplary configurations of microgrid modules. These configurations shown in FIGS. 10 through 14 are merely exemplary and other configurations in different arrangements and with more or fewer microgrid modules can be implemented to meet particular needs for power. In the exemplary embodiment shown in FIG. 10, four microgrid modules are connected in series via inter-microgrid connections or ties and DC power can be transmitted in both directions between each microgrid module. FIG. 10 also shows an expanded view of microgrid module #1 illustrating certain of the internal components of the exemplary microgrid module. The expanded view shown in FIG. 10 shows a bus interface controller or power router coupled to an internal DC bus within the microgrid module. The expanded view also shows the power router connected to the connection hub by contacts KDN-1 and KDN-2 which can be used to connect or disconnect the microgrid module to the inter-microgrid tie.

FIGS. 11 through 14 illustrate other exemplary configurations for multiple microgrid modules. These other arrangements employ components similar to those described previously, but allow microgrid modules to be coupled to more than one other microgrid module. In configurations comprising multiple microgrid modules, the microgrid modules can be arranged in different ways. For example, in some configurations, the multiple microgrid modules can be managed centrally by a power router software module located on one microgrid module. In alternative embodiments, each microgrid module can comprise its own power router software module and can be managed locally.

Figure 15:
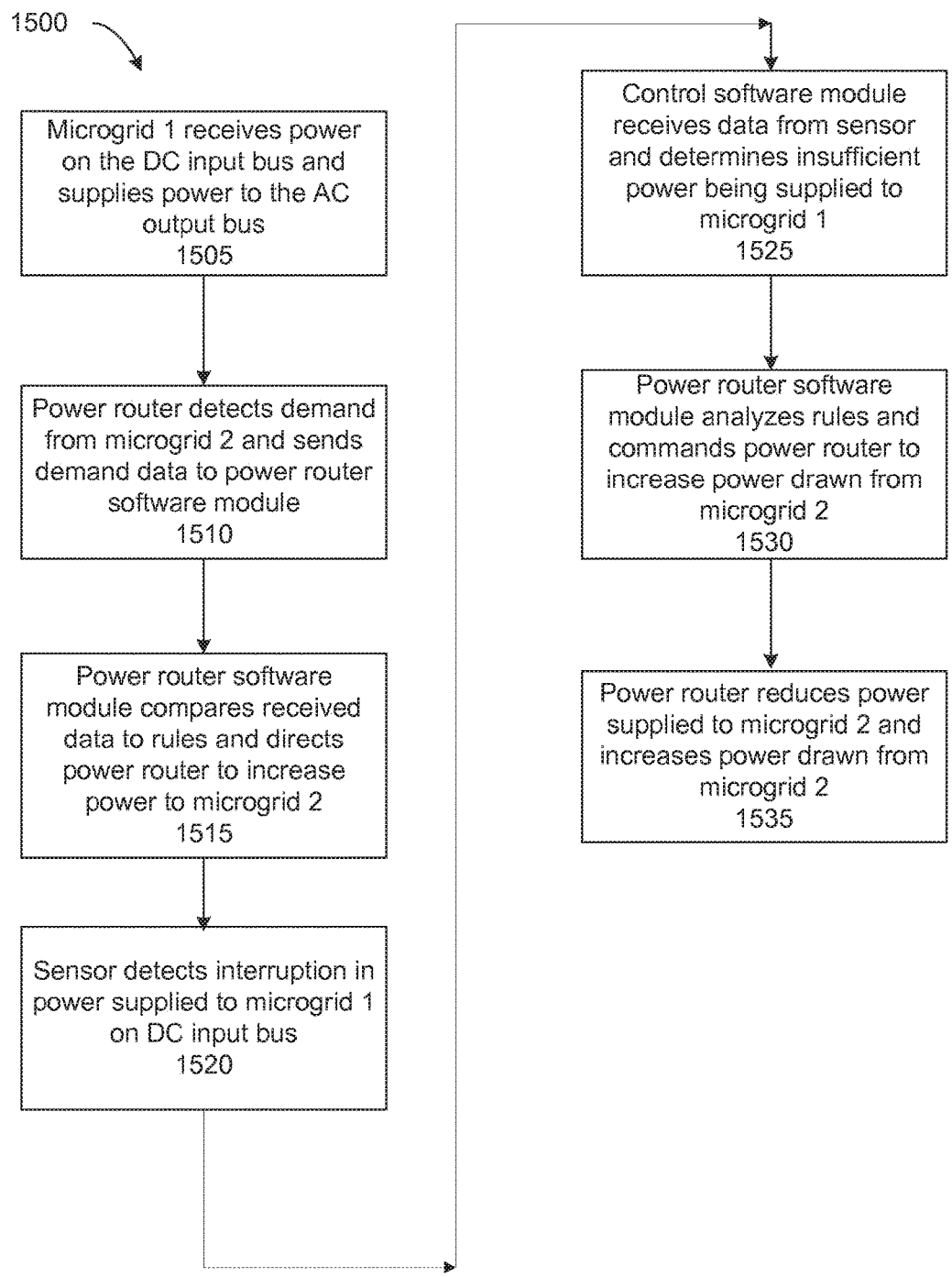
FIG. 15 is a flow chart diagram illustrating a process for managing the operation of a plurality of microgrid modules coupled together in accordance with an exemplary embodiment of the present invention.

Referring to FIG. 15, a method 1500 is illustrated describing the operation of multiple microgrid modules coupled together in accordance with one exemplary embodiment of the invention. Exemplary process 1500 begins with microgrid module 1 receiving power on a DC input bus and supplying power to an AC output bus in step 1505. As explained above, the microgrid modules can comprise components for converting DC power to AC power and vice versa. In step 1510, the power router detects a demand for power from microgrid module 2 and sends the demand data to the power router software module. In step 1515, the power router software module compares the received demand data to one or more rules governing the operation of microgrid module 1. Assuming the rules are satisfied, the power router software module directs the power router to increase the power delivered from microgrid module 1 to microgrid module 2. Alternatively, if microgrid module 1 did not have power to spare, the demand for additional power could be declined.

Referring to step 1520, a sensor in the circuitry layer of microgrid module 1 detects an interruption in the power supplied to microgrid module 1 on the DC input bus. In step 1525, the control software module receives data from the sensor and determines that insufficient power is being supplied to microgrid module 1. While steps 1520 and 1525, and the other steps illustrated in exemplary process 1500, are shown in sequence, those skilled in the art will appreciate that certain steps can occur in parallel or in a different sequence from that illustrated in process 1500. For example, the receipt of data from sensors at the control software module in step 1520 and 1525 is a step that can occur at various times throughout process 1500.

Referring to step 1530, the power router software module analyzes the rules and commands the power router to increase the power drawn from microgrid module 2. The actions of the power router software module can be triggered by a command from the control software module. Alternatively, the power router software module can be implemented to periodically or in real-time monitor the status of the microgrid module and control the power router accordingly. In response to the insufficient power being supplied to microgrid module 1, in step 1535, the power router reduces the power that microgrid module 1 supplies to microgrid module 2 and increases the power supplied by microgrid module 2 to microgrid module 1.

The steps in exemplary process 1500 are merely one example of the applications for the power router software module and managing multiple microgrid modules. Those of skill in the art will appreciate that not all of the steps illustrated in process 1500 are required in order to use the microgrid module. Furthermore, the steps of process 1500 can be performed in other sequences and other steps can be added for other applications of the microgrid module.

In conclusion, the invention, as described in the foregoing exemplary embodiments, comprises multiple coupled microgrid modules that can receive either AC or DC power from a variety of power sources and supply either AC or DC power to a load or storage device. Because the microgrid modules are coupled, they can also be managed to share power. A power router at a first microgrid module can detect a demand for power from a second microgrid module. A power router software module can decide whether the first microgrid power will supply additional power to the second microgrid module in response to the demand. The power router can also adjust the voltage or form of the power delivered to the second microgrid module.

The embodiments set forth herein are intended to be exemplary. From the description of the exemplary embodiments, equivalents of the elements shown herein and ways of constructing other embodiments of the invention will be apparent to practitioners of the art. For example, conventional electrical components can be added or modified within the microgrid but remain within the scope of the invention. Similarly, the methods described herein are merely exemplary and the power router software module can be designed in a variety of ways to control the operation of one or more microgrid modules. Many other modifications, features and embodiments of the invention will become evident to those of skill in the art. It should be appreciated, therefore, that many aspects of the invention were described above by way of example only and are not intended as required or essential elements of the invention unless explicitly stated otherwise. Accordingly, it should be understood that the foregoing relates only to certain embodiments of the invention and that numerous changes can be made therein without departing from the spirit and scope of the invention.

We claim:

1. A non-transitory computer readable medium comprising computer executable program instructions for managing the operation of a plurality of microgrid modules, the computer executable program instructions comprising:
   first program instructions for receiving power flow data sensed by a sensor indicating a first microgrid module is receiving power on a DC bus, converting the power to AC power, and supplying the power directly to a load which is a second microgrid module on an AC output bus via an inter-microgrid connection;
   second program instructions for receiving demand data sensed by a sensor indicating a demand for additional power from the load;
   third program instructions for comparing the demand data to rules stored in a computer readable memory, determining a command to send to a controllable element of the first microgrid module, and sending the command to the controllable element to control an operation of the first microgrid module,
   wherein the non-transitory computer executable program instructions are executed on a computer comprising a processor and a memory.

2. A non-transitory computer readable medium according to claim 1, wherein demand data is received by a sensor of the first microgrid module.

3. A computer readable medium according to claim 2, wherein the sensor is capable of sensing one or more of the group consisting of: a direction, voltage, current, power, change in direction, change in voltage, change in current, change in power, rate of change in direction, rate of change in voltage, rate of change in current, and a rate of change in power.

4. A computer readable medium according to claim 1, wherein:
   the controllable element is a power router element; and
   the command is to increase the power supplied to the load.

5. A non-transitory computer readable medium according to claim 4, wherein the computer executable program instructions further comprise:
   fourth program instructions to retrieve one or more business parameters stored in the computer-readable memory and to convert the one or more business parameters into the rules.

6. A non-transitory computer readable medium according to claim 5, wherein the business parameters comprise one or more of the group consisting of: a cost of power from an AC power grid, a cost of power from an alternate power source coupled to the first microgrid module, an expected load demand, and a power source preference.

7. A non-transitory computer readable medium according to claim 6, wherein the rules comprise one or more of the group consisting of: a time when the first microgrid module will draw power from the AC power grid, the alternate power source, or from the second microgrid module.

8. A non-transitory computer readable medium according to claim 7, wherein the computer executable program instructions further comprise:
   fifth program instructions to adjust the rules based on historical demand data and log data describing operation of the first microgrid module over time.

9. A non-transitory computer readable medium comprising computer executable program instructions for managing the operation of a plurality of microgrid modules, the computer executable program instructions comprising:
   first program instructions for receiving power flow data sensed by a sensor indicating a first microgrid module is receiving power on a DC bus, converting the power to AC power, and supplying the power directly to a second microgrid module on an AC output bus via an inter-microgrid connection;
   second program instructions for receiving demand data sensed by a sensor indicating a demand for additional power from a second microgrid module;
   third program instructions for comparing the demand data to rules stored in a computer readable memory, determining a command to increase the power supplied to the second microgrid module, and sending the command to a controllable element to control an operation of the first microgrid module, wherein the rules include a time when the first microgrid module will draw power from one of an AC power grid and an alternate power source,
   and further wherein the non-transitory computer executable program instructions are executed on a computer comprising a processor and a memory.

10. A non-transitory computer readable medium according to claim 9, wherein the computer executable program instructions further comprise:
    fourth program instructions to retrieve one or more business parameters stored in the computer-readable memory and to convert the one or more business parameters into the rules.

11. A non-transitory computer readable medium according to claim 10, wherein the business parameters comprise one or more of the group consisting of: a cost of power from an AC power grid, a cost of power from an alternate power source coupled to the first microgrid module, an expected load demand, and a power source preference.

12. A computer readable medium according to claim 9, wherein:
    the controllable element is a power router element.

13. A non-transitory computer readable medium comprising computer executable program instructions for managing the operation of a plurality of microgrid modules, the computer executable program instructions comprising:
    first program instructions for receiving power flow data sensed by a sensor indicating a first microgrid module is receiving power on a DC bus, converting the power to AC power, and supplying the power directly to a load which is a second microgrid module on an AC output bus via an inter-microgrid connection;
    second program instructions for receiving demand data sensed by a sensor indicating a demand for additional power from the load;
    third program instructions for comparing the demand data to rules stored in a computer readable memory, determining a command to send to a controllable element of the first microgrid module, and sending the command to the controllable element to control an operation of the first microgrid module;
    fourth program instructions to retrieve one or more business parameters stored in the computer-readable memory and to convert the one or more business parameters into the rules;
    fifth program instructions to adjust the rules based on historical demand data and log data describing operation of the first microgrid module over time, wherein the non-transitory computer executable program instructions are executed on a computer comprising a processor and a memory.

14. A computer readable medium according to claim 13, wherein:
the controllable element is a power router element; and
the command is to increase the power supplied to the load.

* * * * *